United States Patent
Tanabe et al.

(10) Patent No.: US 11,999,275 B2
(45) Date of Patent: Jun. 4, 2024

(54) CONVEYANCE SEAT

(71) Applicant: TS TECH CO., LTD., Saitama (JP)

(72) Inventors: Jinichi Tanabe, Tochigi (JP); Tatsuki Nonaka, Tochigi (JP); Atsushi Yamabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/024,985

(22) PCT Filed: Sep. 8, 2021

(86) PCT No.: PCT/JP2021/033002
§ 371 (c)(1),
(2) Date: Mar. 7, 2023

(87) PCT Pub. No.: WO2022/054830
PCT Pub. Date: Mar. 17, 2022

(65) Prior Publication Data
US 2023/0373366 A1    Nov. 23, 2023

Related U.S. Application Data

(60) Provisional application No. 63/082,066, filed on Sep. 23, 2020, provisional application No. 63/075,944, filed on Sep. 9, 2020.

(51) Int. Cl.
*B60N 2/427*    (2006.01)
*B60N 2/68*     (2006.01)
*B60R 21/207*   (2006.01)

(52) U.S. Cl.
CPC ............. *B60N 2/427* (2013.01); *B60N 2/68* (2013.01); *B60R 21/207* (2013.01)

(58) Field of Classification Search
CPC .......... B60R 21/207; B60N 2/427; B60N 2/68
See application file for complete search history.

(56) References Cited

U.S. PATENT DOCUMENTS 8,313,140 B2 *  11/2012  Niitsuma ........... B60N 2/42727
                                                297/216.12
9,969,351 B2 *   5/2018  Ohno ................ B60R 21/23138
(Continued)

FOREIGN PATENT DOCUMENTS

JP    S60-234037 A    11/1985
JP    2015-024771 A    2/2015
(Continued)

OTHER PUBLICATIONS

International Search Report dated Nov. 30, 2021 for the corresponding PCT Application No. PCT/JP2021/033002, with English machine translation.

*Primary Examiner* — Faye M Fleming
(74) *Attorney, Agent, or Firm* — Michael Best & Friedrich LLP

(57) ABSTRACT

Provided is a conveyance seat equipped with a side airbag device with which an airbag can be inflation-deployed in a more stable state. The conveyance seat includes a seat back and a side airbag device attached to a side portion of the seat back. The seat back includes a back frame having a side frame and a side support member attached to the front part of the side frame and protruding to the seat front side beyond the side frame. The side airbag device has a first airbag inflated on the outside surface side of the side frame and a second airbag inflated on the inside surface side of the side frame. The second airbag passes through a gap formed between the side frame and the side support member in the seat front to back direction and is inflated on the inside surface side of side frame.

15 Claims, 26 Drawing Sheets

(56) References Cited

U.S. PATENT DOCUMENTS

| | | | |
|---|---|---|---|
| 2017/0174174 A1 | 6/2017 | Ohno et al. | |
| 2020/0346604 A1 | 11/2020 | Kobayashi | |
| 2020/0346611 A1 | 11/2020 | Kobayashi | |

FOREIGN PATENT DOCUMENTS

| | | | |
|---|---|---|---|
| JP | 2015-027824 A | 2/2015 | |
| JP | 2015-042517 A | 3/2015 | |
| JP | 2017-087947 A | 5/2017 | |
| JP | 2017-087948 A | 5/2017 | |
| JP | 2017-087949 A | 5/2017 | |
| JP | 2017-109623 A | 6/2017 | |
| JP | 2017-206054 A | 11/2017 | |
| WO | 2019/138954 A1 | 7/2019 | |
| WO | 2019/146382 A1 | 8/2019 | |

* cited by examiner

CONVEYANCE SEAT

CROSS-REFERENCE TO RELATED APPLICATIONS

This application is a National Entry application of PCT Application Serial Number PCT/JP2021/033002, filed Sep. 8, 2021. Further this application claims priority from U.S. Provisional Application No. 63/075,944, filed Sep. 9, 2020, and U.S. Provisional Application No. 63/082,066, filed Sep. 23, 2020, the entire contents of which are hereby incorporated by reference into this application.

TECHNICAL FIELD

The present invention relates to a conveyance seat. More particularly, the present invention relates to a conveyance seat including a side airbag device for mitigating an impact applied from a side of a conveyance.

BACKGROUND ART

Known in the related art is a vehicle seat including a side airbag device attached to a side part of the seat back in the seat width direction in order to mitigate an impact applied from a side of the vehicle (see, for example, PATENT LITERATURE 1).

The vehicle seat described in PATENT LITERATURE 1 includes a seat back and a side airbag device attached to a side portion of the seat back.

The seat back has a back frame having side frames disposed on the right and left sides in the seat width direction. The side airbag device has an airbag module attached to the outside surface of the side frame.

Further, the airbag module has a first airbag inflation-deployed on the outside surface side of the side frame, a second airbag inflation-deployed on the inside surface side of the side frame, and an inflator supplying gas into the first airbag and the second airbag.

By having the first airbag and the second airbag as described above, an occupant (occupant seated in the vehicle seat) can be quickly restrained in the initial stage of the airbag inflation deployment.

CITATION LIST

Patent Literature

PATENT LITERATURE 1: WO 2019/138954 A

SUMMARY OF INVENTION

Technical Problem

By the way, as for a vehicle seat including a side airbag device as in PATENT LITERATURE 1, it has been required to restrain a seated occupant more quickly and more efficiently by airbag inflation deployment in a more stable state.

Specifically, it has been required to inflation-deploy a second airbag in particular in a more stable state in a vehicle seat including a side airbag device having a first airbag inflation-deployed on the outside surface side of a side portion of the seat back and the second airbag inflation-deployed on the inside surface side of the side portion.

The present invention has been made in view of the above problems, and an object of the present invention is to provide a conveyance seat including a side airbag device and enabling airbag inflation deployment in a more stable state.

Solution to Problem

The above object is achieved by means of a conveyance seat including: a seat back serving as a backrest portion; and a side airbag device attached to a side part of the seat back in a seat width direction in order to mitigate an impact applied from a side of a conveyance, in which the seat back includes a back frame having side frames disposed on right and left sides in the seat width direction, and a side support member attached to a seat front part of the side frame and protruding to a seat front side beyond the side frame in order to cause a side portion of the seat back to protrude to the seat front side, the side support member elongatedly extends in an up to down direction along the side frame and is disposed to form a gap with the side frame in a seat front to back direction, the side airbag device includes an airbag module attached to one side surface that is either an outside surface or an inside surface of the side frame, the airbag module has a first airbag inflation-deployed on the one side surface side of the side frame, a second airbag inflation-deployed on the other side surface side of the side frame, and an inflator supplying gas into the first airbag and the second airbag, and the second airbag passes through the gap formed between the side frame and the side support member in the seat front to back direction and is inflation-deployed on the other side surface side of the side frame.

With the configuration described above, it is possible to realize a conveyance seat with which an airbag can be inflation-deployed in a more stable state.

Specifically, by further providing the side support member, the second airbag is capable of passing through the gap formed between the side frame and the side support member in the seat front to back direction and can be inflation-deployed on the other side surface side of the side frame. By doing so, the second airbag can be inflation-deployed in a more stable state. As a result, a seated occupant can be restrained quickly and efficiently.

At this time, the side support member may be a linear member attached to each of an upper part of the side frame and a lower part of the side frame and elongatedly extending in the up to down direction, the airbag module may be attached to the outside surface of the side frame, the first airbag may be inflation-deployed toward the seat front on the outside surface side of the side frame, and the second airbag may pass through the gap formed between the side frame and the linear member and be inflation-deployed toward an inside in the seat width direction on the inside surface side of the side frame.

With the configuration described above, the second airbag can be inflation-deployed in a stable state toward the inside in the seat width direction on the inside surface side of the side frame. As a result, the seated occupant can be restrained more quickly and more efficiently.

At this time, the seat back may include a protective member attached to the side surface of the side frame and covering the side frame, and the protective member may be disposed so as to cover at least a front end portion of the side frame and a rear end portion of the side frame.

In addition, the side frame may have a frame main body portion extending in the seat front to back direction, a front flange portion protruding to an inside in the seat width direction continuously from a front end portion of the frame main body portion, and a rear flange portion protruding to the inside in the seat width direction continuously from a rear end portion of the frame main body portion, the protective member may be a flexible protective plate, and the protective plate may have a plate main body portion covering an inside surface of the frame main body portion, a plate front portion folded back in order to cover the front flange portion continuously from a front end portion of the plate main body portion, and a plate rear portion folded back in order to cover the rear flange portion continuously from a rear end portion of the plate main body portion.

In addition, the back frame may have an upper frame connecting upper end portions of the right and left side frames, and the seat back may include a second protective member covering a part of the upper frame connected to the upper end portion of the side frame.

By providing the protective member protecting the side frame (side frame end portion in particular) as described above, it is possible to suppress unintentional contact of the inflation-deployed second airbag with the side frame (side frame end portion). As a result, the second airbag can be inflation-deployed stably.

At this time, the seat back may include a pad material disposed on a front surface of the back frame, a skin material covering the back frame and the pad material, and a movable body provided at the side portion of the seat back, disposed between the side frame and the pad material in the seat front to back direction, and movable in order to cause the pad material to protrude to the seat front side at the side portion, and the movable body may move to the seat front side as the second airbag is inflation-deployed and cause the pad material to protrude to the seat front side.

In addition, the movable body may have a rotating member attached to the side support member so as to be rotatable, rotating to the seat front side as the second airbag is inflation-deployed, and causing the pad material to protrude to the seat front side.

In addition, the rotating member may have a rotating main body portion attached to the side support member so as to be rotatable and extending to a seat rear from the side support member along a bottom surface of the pad material, and a protruding portion protruding from a front surface of the rotating main body portion toward the pad material and abutting against the pad material.

By providing the movable body (rotating body) movable to the seat front side as the second airbag is inflation-deployed as described above, the deployment force of the second airbag can be efficiently transmitted to the pad material. As a result, the seated occupant can be restrained more quickly and efficiently.

At this time, the side airbag device may further include a guide member guiding the inflation deployment of the second airbag, one end portion of the guide member may be attached to the side frame or an attachment bracket attached to the side frame, and the other end portion of the guide member may be attached to the movable body.

In addition, the side airbag device may further include a guide member guiding the inflation deployment of the second airbag, one end portion of the guide member may be attached to an attachment bracket attached to the side surface of the side frame, and the other end portion of the guide member may be attached to the second airbag, and the attachment bracket may be fastened together with the side frame by an assembly shaft provided on the inflator and protruding from the inflator toward the seat width direction.

In addition, the attachment bracket may have a slit disposed inside the side frame in the seat width direction for the one end portion of the guide member to be inserted therethrough and attached.

By providing the guide member as described above, it is possible to prevent the inflation-deployed second airbag from slipping into the seat rear beyond the side frame.

In addition, by providing the attachment bracket as described above, the guide member can be attached stably.

In addition, since the attachment bracket is fastened together with the side frame by the attachment shaft protruding from the inflator toward the seat width direction, the airbag module and the guide member can be attached stably.

In addition, since the attachment bracket has the slit, one end portion of the guide member can be attached with ease.

At this time, the seat back may include a pad material disposed on a front surface of the back frame and a skin material covering the back frame and the pad material, the side airbag device may have a retainer member holding the airbag module from a seat rear side, the retainer member may have a rear wall portion disposed on the seat rear side of the airbag module, and a side wall portion extending to the seat front side along a side surface of the airbag module continuously from one end portion of the rear wall portion in the seat width direction, and the side wall portion may extend to the seat front side up to a skin burst-open portion or a position reaching a vicinity of the skin burst-open portion provided at the skin material and burst-opening when the first airbag is inflation-deployed.

In addition, the side airbag device may have a retainer member holding the airbag module from a seat rear side, the retainer member may have a rear wall portion disposed on the seat rear side of the airbag module, a side wall portion disposed along the other side surface of the side frame, and a reinforcement portion attached to a rear surface of the rear wall portion and protruding to the seat rear, and the side wall portion may be fastened together with the side frame by an assembly shaft provided on the inflator and protruding from the inflator toward the seat width direction.

By having the retainer member as described above, the retainer member is capable of suitably receiving pressure entailed by the inflation deployment of the airbag. As a result, the inflation deployment directions of the first airbag and the second airbag can be stabilized.

In addition, the retainer member extends to the seat front side up to the skin burst-open portion or the position reaching the vicinity of the skin burst-open portion burst-opening when the first airbag is inflation-deployed. Therefore, the pressure received by the retainer member can be efficiently transmitted to the skin burst-open portion to burst-open the skin burst-open portion.

In addition, the retainer member can be stably attached since the retainer member is fastened together with the side frame by the assembly shaft protruding from the inflator toward the seat width direction.

At this time, the side airbag device may have a retainer member holding the airbag module from a seat lateral side, the retainer member may have a side wall portion disposed along the side surface of the side frame, a front wall portion protruding in the seat width direction continuously from a front end portion of the side wall portion and disposed on a seat rear side of the second airbag when the second airbag is inflation-deployed, and a reinforcement portion attached to a rear surface of the front wall portion and protruding to the seat rear, and the side wall portion may be fastened together with the side frame by an assembly shaft provided on the inflator and protruding from the inflator toward the seat width direction.

By having the retainer member as described above, the retainer member is capable of suitably receiving pressure entailed by the inflation deployment of the second airbag. As a result, the inflation deployment direction of the second airbag can be stabilized.

In addition, since the retainer member has the reinforcement portion, the holding force of the retainer member can be increased efficiently.

At this time, the seat back may include a pad material disposed on a front surface of the back frame and a skin material covering the back frame and the pad material, the pad material may have a pad through hole formed at a position in front of the airbag module in the side portion of the seat back and penetrating the pad material from an outside surface to an inside surface, the skin material may have a skin burst-open portion burst-opening during the inflation deployment of the first airbag on an outside surface of the side portion, the side airbag device may include a guide member guiding the inflation deployment of the first airbag, and the guide member may have a configuration in which one end portion of the guide member is attached to a front part or an outside part of the skin material at the side portion, the guide member extends continuously from the one end portion of the guide member and passes through the pad through hole formed in the outside surface of the pad material at the side portion, and the other end portion of the guide member passes through the pad through hole formed in the inside surface of the pad material at the side portion and is attached to an inside part of the skin material at the side portion.

With the above configuration, the guide member is capable of suitably guiding the pad material moving along with the inflation deployment of the airbag on the side portion of the seat back. As a result, the airbag can be inflation-deployed more quickly.

Advantageous Effects of Invention

According to the present invention, it is possible to realize a conveyance seat with which an airbag can be inflation-deployed in a more stable state. Further, an occupant seated in the conveyance seat can be restrained quickly and efficiently.

In addition, according to the present invention, the second airbag can be inflation-deployed in a stable state toward the inside in the seat width direction on the inside surface side of the side frame.

In addition, according to the present invention, by means of the protective member, it is possible to suppress contact of the inflation-deployed second airbag with the side frame (side frame end portion).

In addition, according to the present invention, by means of the movable body, the deployment force of the second airbag can be efficiently transmitted to the pad material. As a result, the seated occupant can be restrained more quickly and efficiently.

In addition, according to the present invention, by means of the guide member, it is possible to prevent the inflation-deployed second airbag from slipping into the seat rear beyond the side frame.

In addition, according to the present invention, by means of the attachment bracket, the guide member and the airbag module can be attached stably. In addition, one end portion of the guide member can be attached with ease.

In addition, according to the present invention, by means of the retainer member, pressure entailed by the inflation deployment of the airbag can be received suitably. In addition, the pressure received by the retainer member can be transmitted to the skin burst-open portion to efficiently burst-open the skin burst-open portion. In addition, the retainer member can be attached stably.

In addition, according to the present invention, by means of the retainer member, pressure entailed by the inflation deployment of the second airbag can be received suitably. In addition, the holding force of the retainer member can be efficiently increased by the reinforcement portion.

In addition, according to the present invention, by means of the guide member, it is possible to suitably guide the pad material moving along with the inflation deployment of the airbag on the side portion of the seat back.

DESCRIPTION OF EMBODIMENTS

Embodiments according to the present invention will be described below with reference to FIGS. 1 to 22.

The present embodiment relates to the invention of a conveyance seat including a side airbag device at a side portion of a seat back. The seat back includes a back frame having a side frame and a side support member attached to the front part of the side frame. The side airbag device includes a first airbag inflation-deployed on the outside surface side of the side frame and a second airbag inflation-deployed on the inside surface side of the side frame. The second airbag passes through the gap formed between the side frame and the side support member in the seat front to back direction and is inflation-deployed on the inside surface side of the side frame.

It should be noted that the side where a seated occupant sits with respect to the seat back of the conveyance seat is the seat front side.

First Embodiment

First, a conveyance seat S1 of a first embodiment will be described with reference to FIGS. 1 to 5.

Figure 1:
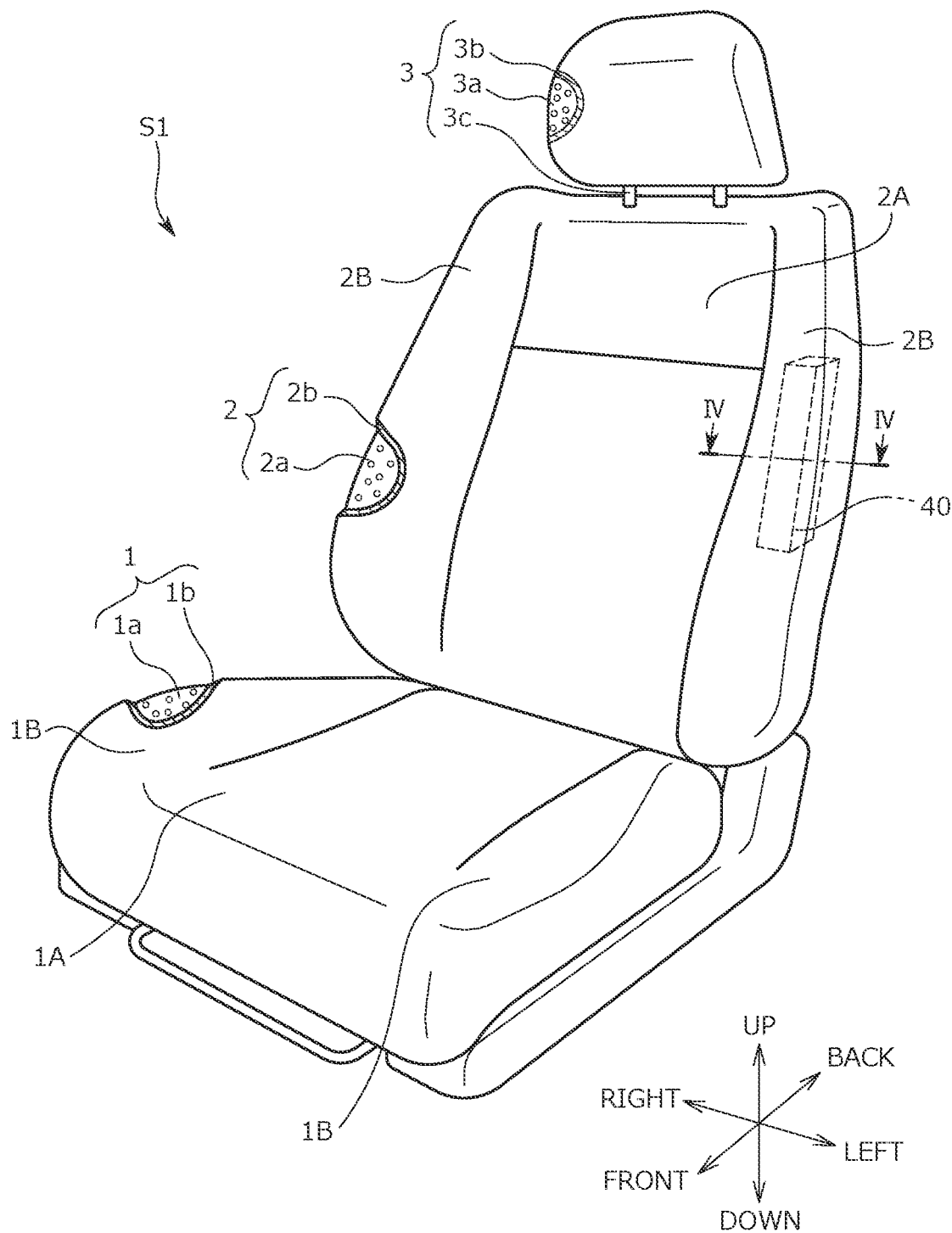
FIG. 1 is an external perspective view of a conveyance seat of the present embodiment.
Figure 2:
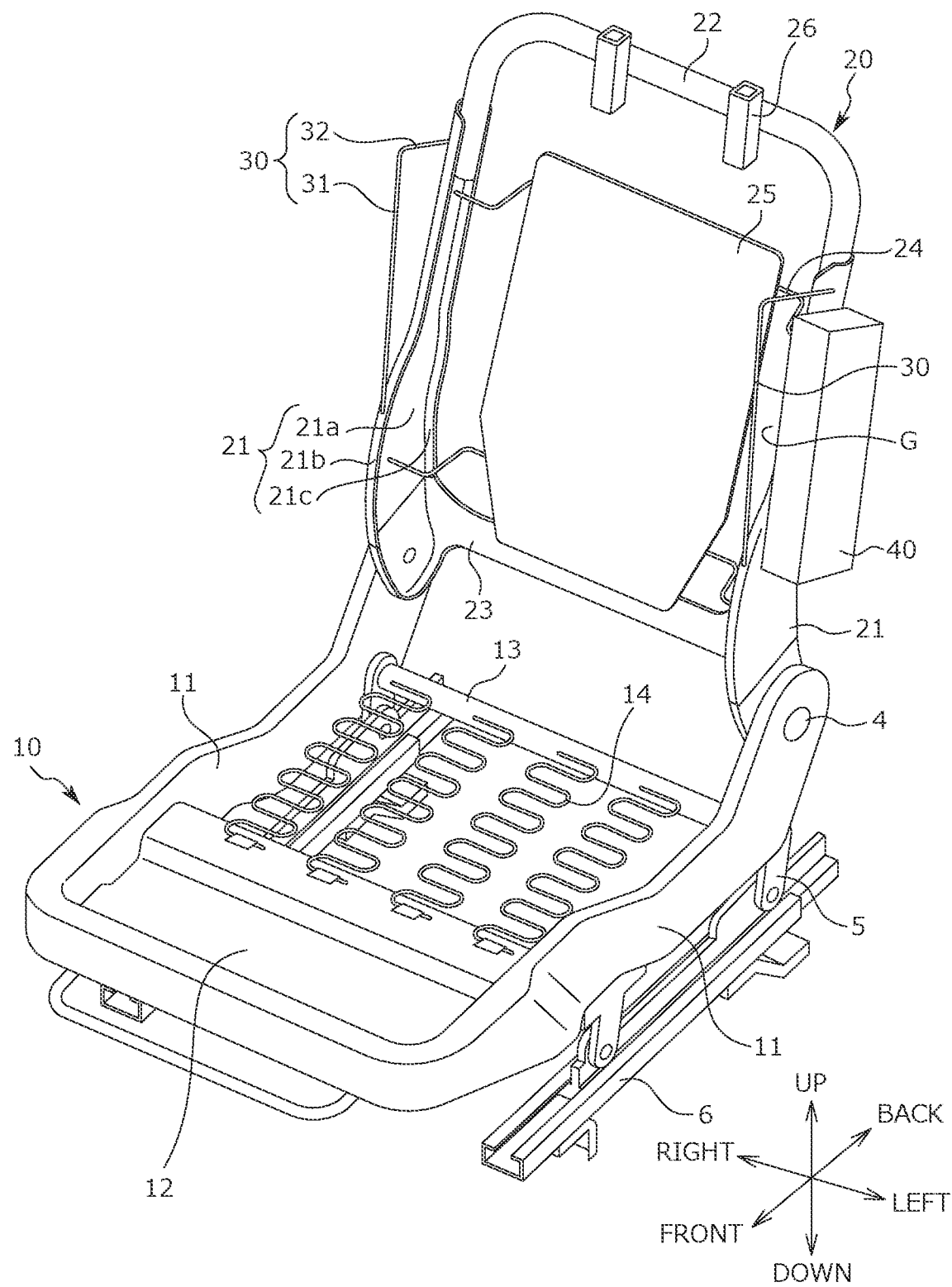
FIG. 2 is a perspective view illustrating a seat frame serving as a skeleton.

As illustrated in FIGS. 1 and 2, the conveyance seat S1 is a vehicle seat and includes a seat main body having a seat cushion 1, a seat back 2, and a headrest 3, side support members 30 attached to the side parts of the seat back 2 in the seat width direction in order to cause the side portions of the seat back 2 to protrude to the seat front side and be held, and a side airbag device 40 attached to the side part of the seat back 2 in the seat width direction in order to mitigate an impact applied from the side of the vehicle.

As illustrated in FIG. 1, the seat cushion 1 is a seating portion that supports a seated occupant from below and is configured by placing a pad material 1a on a cushion frame 10, which serves as a skeleton and is illustrated in FIG. 2, and being covered with a skin material 1b.

The seat cushion 1 is configured from a middle portion 1A at the middle part in the seat width direction and right and left side portions 1B (side bolster portions) outside the middle portion 1A in the seat width direction.

As illustrated in FIG. 1, the seat back 2 is a backrest portion that supports the back of the seated occupant from behind and is configured by placing a pad material 2a on a back frame 20, which serves as a skeleton and is illustrated in FIG. 2, and being covered with a skin material 2b.

The seat back 2 is configured from a middle portion 2A at the middle part in the seat width direction and right and left side portions 2B outside the middle portion 2A in the seat width direction.

It should be noted that right and left pull-in grooves extending in the up to down direction are formed on the surface of the pad material 2a so as to divide the middle portion 2A and the right and left side portions 2B.

As illustrated in FIG. 1, the headrest 3 is a head portion that supports the head of the seated occupant from behind and is configured by placing a pad material 3a on a pillar 3c serving as a core material and being covered with a skin material 3b.

It should be noted that a pillar attachment member 26 for attaching the pillar 3c supporting the main body of the headrest 3 is assembled to the upper portion of the back frame 20.

As illustrated in FIG. 2, the cushion frame 10 as a rectangular frame-shaped body is configured mainly from cushion side frames 11 disposed on the right and left sides, a plate-shaped pan frame 12 (bridging frame) provided to serve as a bridge between the front end parts of the cushion side frames 11, a rear connection frame 13 connecting the rear parts of the cushion side frames 11, and a plurality of support members 14 (elastic springs) hooked on the pan frame 12 and the rear connection frame 13 and extending in the seat front to back direction.

The cushion side frame 11 is a plate-shaped frame elongated in the seat front to back direction.

It should be noted that a reclining device 4 is attached to the rear part of the cushion side frame 11 and a rail device 6 is attached to the lower part of the cushion side frame 11 via a height link device 5.

As illustrated in FIG. 2, the back frame 20 as a rectangular frame-shaped body is configured mainly from side frames 21 disposed on the right and left sides, an inverted U-shaped upper frame 22 interconnecting the upper end parts of the side frames 21, a plate-shaped lower frame 23 interconnecting the lower end parts of the side frames 21, a plurality of wire members 24 (elastic wires) respectively hooked on the side frames 21 and extending in the seat width direction, and a support plate 25 held by the plurality of wire members 24 and supporting the seated occupant.

It should be noted that the back frame 20 further includes the pillar attachment member 26 attached to the middle part of the upper frame 22 in the seat width direction in order to attach the pillar 3c of the headrest 3.

The side frame 21 is a sheet metal member extending in up to down direction and having a substantially C-shaped cross section. The lower end part of the side frame 21 is connected to the rear end part of the cushion side frame 11 via the reclining device 4.

By means of the reclining device 4, the back frame 20 is capable of rotating relative to the cushion frame 10.

Figure 4A:
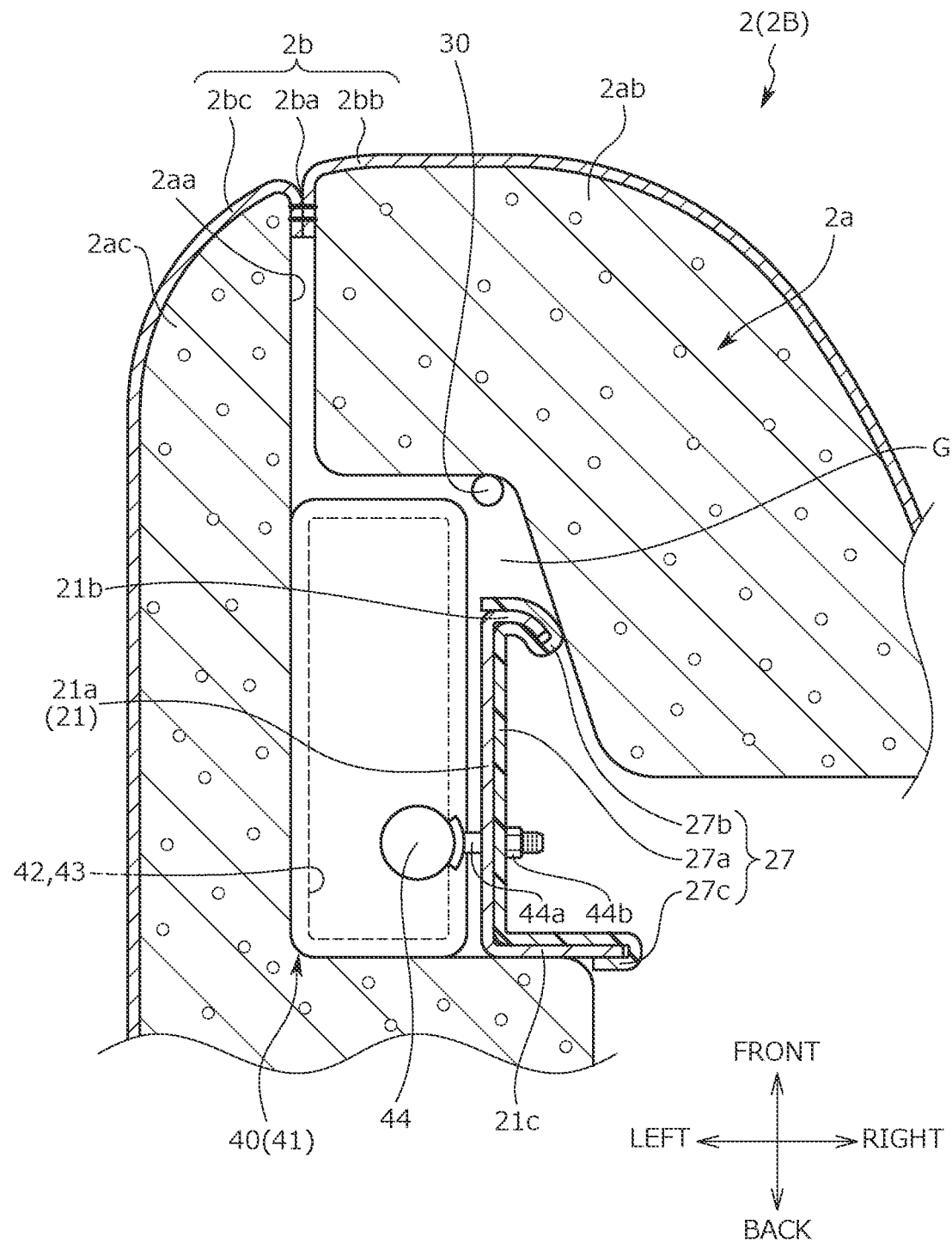
FIG. 4A is a sectional view taken along line IV-IV of FIG. 1.

Specifically, as illustrated in FIGS. 2 and 4A, the side frame 21 has a frame main body portion 21a extending in the seat front to back direction, a front flange portion 21b protruding to the inside in the seat width direction continuously from the front end portion of the frame main body portion 21a, and a rear flange portion 21c protruding to the inside in the seat width direction continuously from the rear end portion of the frame main body portion 21a.

Figure 4B:
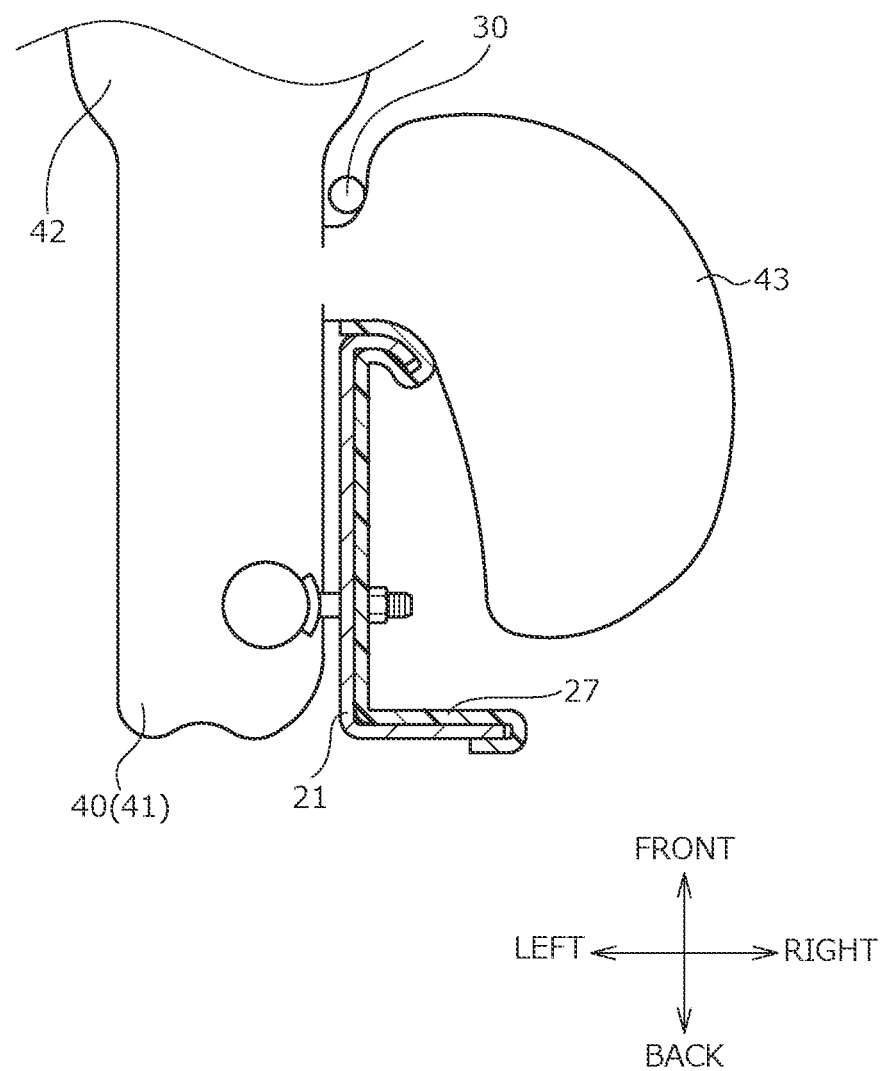
FIG. 4B is a sectional view taken along line IV-IV of FIG. 1, which illustrates a state where a first airbag and a second airbag are inflation-deployed.

In addition, as illustrated in FIGS. 4A and 4B, a protective member 27 is attached to the inside surface of the side frame 21 to cover the side frame 21 from the inside in the seat width direction.

Figure 5:
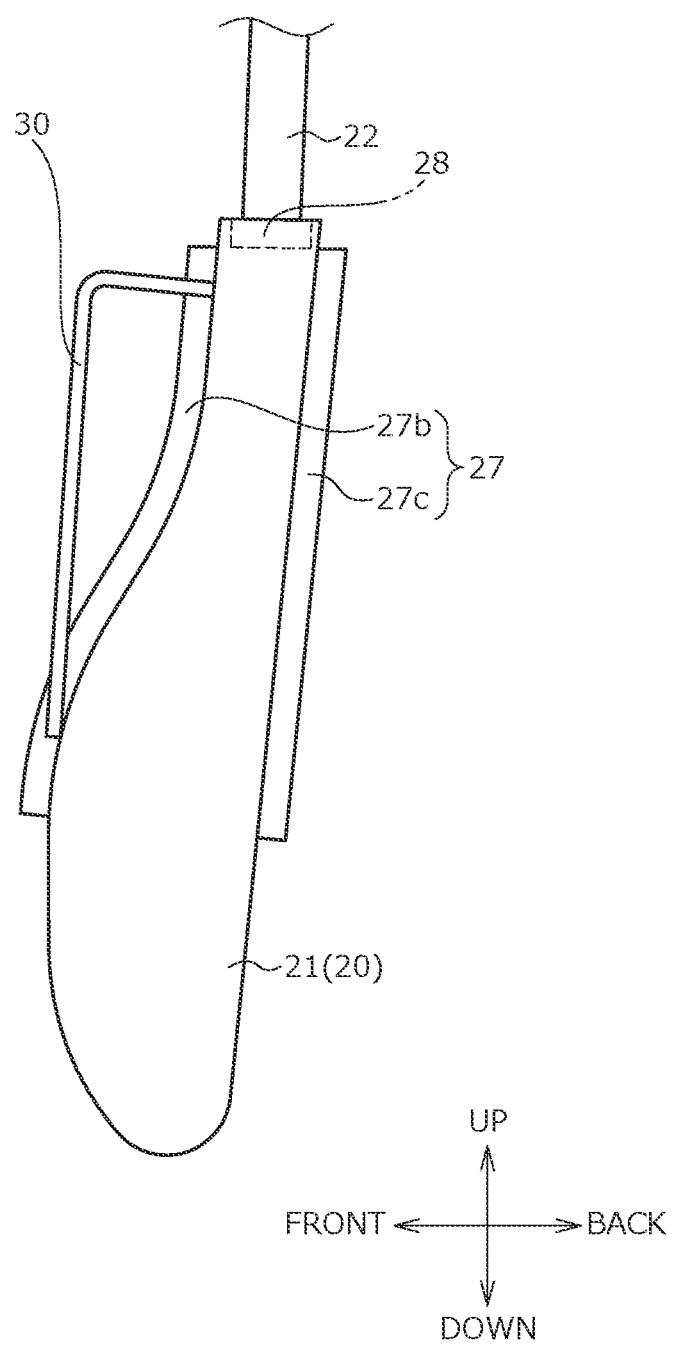
FIG. 5 is a side view illustrating the back frame, the side support member, and a protective member.

In addition, as illustrated in FIG. 5, a second protective member 28 is attached to the lower end part of the upper frame 22 that is connected to the upper end portion of the side frame 21 and covers the lower end part from below.

The protective member 27 is a flexible protective plate that protects the side frame 21.

As illustrated in FIGS. 4A and 4B, the protective member 27 has a plate main body portion 27a covering the inside surface of the frame main body portion 21a, a plate front portion 27b folded back in order to cover the front flange portion 21b continuously from the front end portion of the plate main body portion 27a, and a plate rear portion 27c folded back in order to cover the rear flange portion 21c continuously from the rear end portion of the plate main body portion 27a.

The second protective member 28 is a flexible protective cap that protects the upper frame 22 and is attached to the lower end portion of the pipe-shaped upper frame 22.

The protective member 27 and the second protective member 28 have the function of preventing the airbag of the side airbag device 40 from coming into direct contact with the back frame 20 when the airbag has been inflation-deployed.

As illustrated in FIG. 5, the protective member 27 is attached along the side frame 21 so as to be elongated in the up to down direction.

In addition, the protective member 27 is disposed at a position overlapping the side airbag device 40 in the up to down direction and the seat front to back direction (specifically, the same position).

Figure 3A:
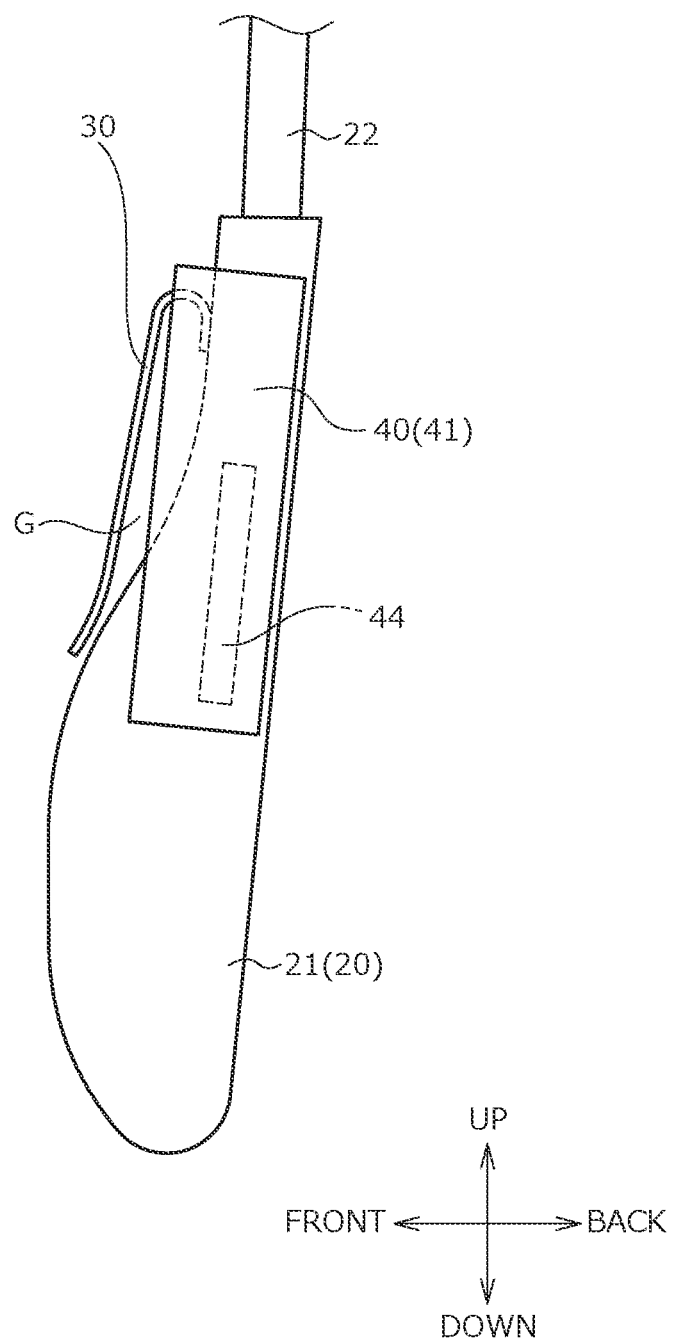
FIG. 3A is a side view illustrating a back frame, a side support member, and a side airbag device.
Figure 3B:
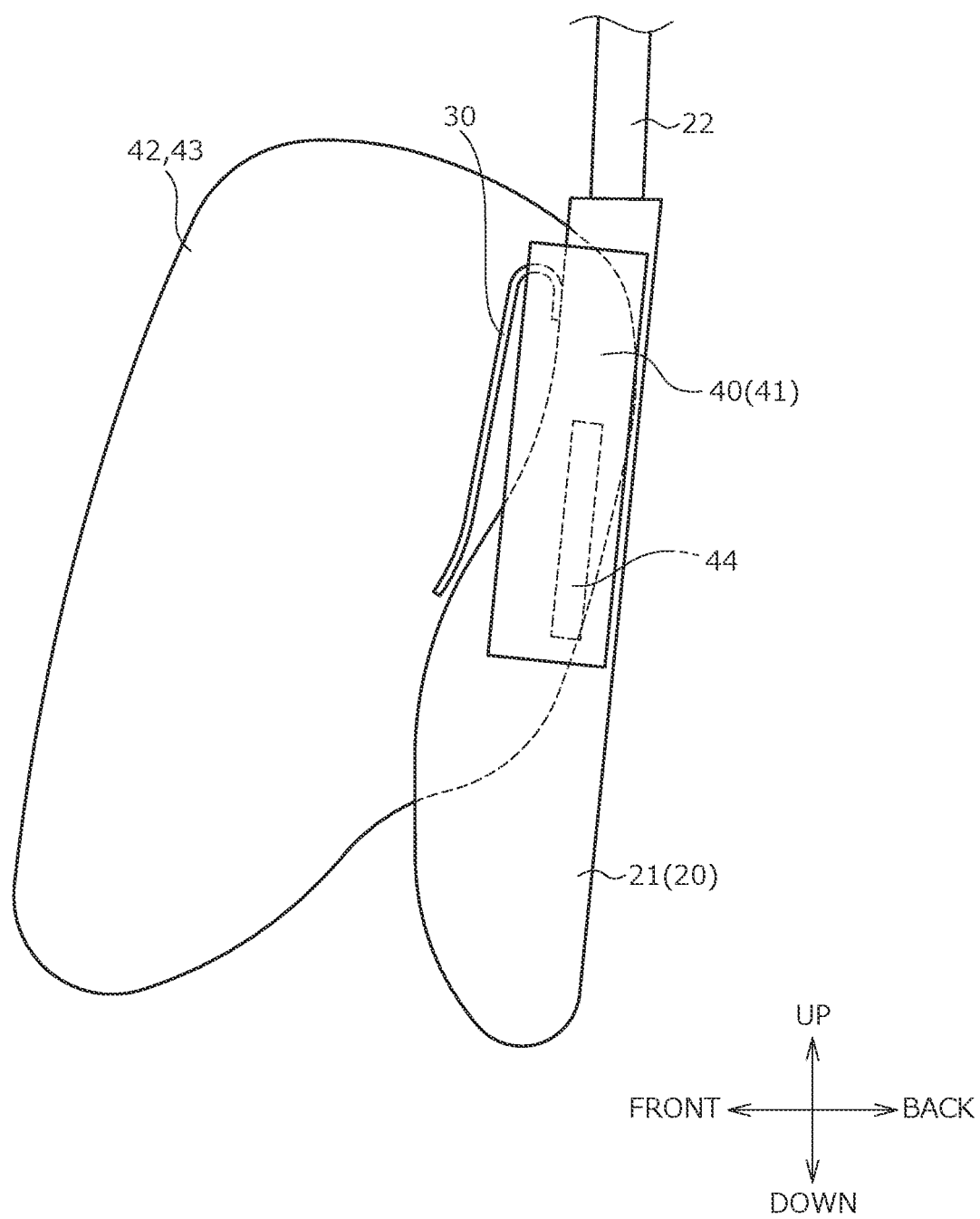
FIG. 3B is a side view illustrating a state where the airbag illustrated in FIG. 3A is inflation-deployed.

As illustrated in FIGS. 2, 3A, and 3B, the side support members 30 are linear members made of a metal material (specifically, wire members) and are attached by welding to the seat front parts of the right and left side frames 21.

The side support member 30 is attached to the front surface of the side frame 21, protrudes to the seat front side beyond the side frame 21, and is a member for causing the side portion 2B of the seat back 2 to protrude to the seat front side.

It should be noted that although details will be described later, the side support member 30 has the function of causing the side portion of the seat back 2 to protrude to the seat front side and holding the side portion and a function for inflation-deploying the airbag of the side airbag device 40 in a stable state.

Specifically, the side support member 30 is configured mainly from a wire main body portion 31 elongatedly extending along the elongation direction of the side frame 21 and a wire extending portion 32 extending rearward from the upper end portion of the wire main body portion 31.

Further, the wire extending portion 32 is welded and fixed in a state of abutting against the front surface of the upper part of the side frame 21, and the lower end portion of the wire main body portion 31 is welded and fixed in a state of abutting against the front surface of the lower part of the side frame 21.

In the above configuration, as illustrated in FIGS. 2 and 3A, the side support member 30 elongatedly extends in the up to down direction along the side frame 21 and is disposed to form a gap G with the side frame 21 in the seat front to back direction.

In addition, the side support member 30 is disposed at a position overlapping the side airbag device 40 in the up to down direction and the seat front to back direction (specifically, the same position).

As illustrated in FIGS. 1 to 3A and 3B, the side airbag device 40 has a configuration in which folded airbags 42 and 43 are inflation-deployed, in a balloon shape and toward the seat front side, in the event of an impact from the side of the vehicle body.

As illustrated in FIGS. 4A and 4B, the side airbag device 40 includes an airbag module 41 provided in the pad material 2a in the side portion 2B of the seat back 2 and attached to the outside surface of the side frame 21.

The airbag module 41 is configured mainly from the first airbag 42 inflation-deployed on the outside surface side of the side frame 21, the second airbag 43 inflation-deployed on the inside surface side of the side frame 21, an inflator 44 supplying gas into the first airbag 42 and the second airbag 43, and a harness (not illustrated) connected to the inflator 44 and supplying electric power for ignition to the inflator 44.

It should be noted that the harness is connected to a vehicular battery (not illustrated) disposed on the vehicle body.

As illustrated in FIGS. 4A and 4B, the first airbag 42 is inflation-deployed toward the seat front on the outside surface side of the side frame 21.

The second airbag passes through the gap G formed between the side frame 21 and the side support member 30 and is inflation-deployed toward the seat front and the inside in the seat width direction on the inside surface side of the side frame 21.

Specifically, the airbags 42 and 43 are inflation-deployed by gas supply from the inflator 44, which is a gas generation source, toward the insides of the airbags 42 and 43.

The inflator 44 is an elongated and substantially cylindrical gas generator and is disposed so as to be elongated in the up to down direction.

The inflator 44 has a plurality of assembly shafts 44a protruding to the inside in the seat width direction from the outside surface thereof and assembled to the side frame 21.

It should be noted that the inflator 44 further has an airbag connecting portion (not illustrated) protruding from the outer surface thereof and connected to the inside of the airbag 11 and a harness connecting portion (not illustrated) formed on the outer surface of the inflator 44 and connected to the harness.

The plurality of assembly shafts 44a are disposed at intervals in the up to down direction. Each of the plurality of assembly shafts 44a passes through assembly holes provided in the side frame 21 and the protective member 27 and is fastened to an assembly nut 44b.

In other words, the assembly shaft 44a fastens the side frame 21 and the protective member 27 together with the assembly nut 44b.

In the above configuration, as illustrated in FIGS. 4A and 4B, in the event of inflation deployment of the airbags 42 and 43, the pad material 2a is divided into an inner pad tab and an outer pad 2ac by a pad through hole 2aa serving as a branching point and deployed.

In addition, in the event of inflation deployment of the airbags 42 and 43, the skin material 2b is divided into an inner skin material 2bb and an outer skin material 2bc by a skin burst-open portion 2ba serving as a branching point and deployed.

The pad through hole 2aa is a through hole penetrating the pad material 2a in the seat front to back direction and is formed so as to be elongated in the up to down direction.

Likewise, the skin burst-open portion 2ba is formed so as to be elongated in the up to down direction.

The pad through hole 2aa and the skin burst-open portion 2ba are formed at positions closer to the seat front than the airbag module 41 and are disposed at positions overlapping the airbag module 41 in the seat width direction (specifically, the same positions).

Therefore, the airbag can be inflation-deployed in a more stable state.

In addition, in the above configuration, as illustrated in FIGS. 4A and 4B, the second airbag 43 is configured to pass through the gap G formed between the side frame 21 and the side support member 30 in the seat front to back direction and be inflation-deployed on the inside surface side of the side frame 21.

Therefore, the second airbag 43 can be inflation-deployed toward the seat front and the inside in the seat width direction in a more stable state.

In other words, by using the side support member 30 as a guide member, it is possible to suppress, for example, unintentional deployment of the second airbag 43 toward the seat front side.

In addition, in the above configuration, as illustrated in FIGS. 4A, 4B, and 5, the protective member 27 and the second protective member 28 are attached so as to cover the side frame 21 and the upper frame 22, respectively.

Regarding the protective member 27 in particular, the plate front portion 27b is provided so as to not only cover the tip portion of the side frame 21 (front flange portion 21b) so as to be folded back but also cover the entire (substantially the entire) front surface of the front flange portion 21b.

Further, the plate rear portion 27c also covers the tip portion of the side frame 21 (rear flange portion 21c) so as to be folded back. It should be noted that it is not particularly necessary to cover the entire rear surface of the side frame 21 and thus covering is performed up to the periphery of the tip portion of the rear flange portion 21c.

Therefore, unintentional contact of the inflation-deployed second airbag 43 with the end portion of the side frame 21 can be suitably suppressed.

Others

Although the side support member 30 and the side airbag device 40 in the above embodiment are attached to the side portion 2B of the seat back 2 as illustrated in FIGS. 1 and 2, the attachment is not particularly limited and the side support member 30 and the side airbag device 40 may be attached to the side portion 1B of the seat cushion 1.

Although the side support member 30 in the above embodiment is a wire member formed of a metal material as illustrated in FIG. 2, this is changeable and is not particularly limited.

The side support member 30 may be configured to hold the seated occupant from the side in the seat width direction and may be, for example, a plate-shaped member, a rod-shaped member, a movable plate, an inflatable bag member, or the like.

Although the protective member 27 in the above embodiment is configured as a protective plate as illustrated in FIGS. 4A and 5, this is changeable and is not particularly limited.

For example, the protective member 27 may be divided into a member covering the front end portion of the side frame 21 and a member covering the rear end portion of the side frame 21 and configured from the plurality.

Although the side airbag device 40 (airbag module 41) in the above embodiment is attached to the outside surface of the side frame 21 as illustrated in FIGS. 4A and 4B, the attachment is not particularly limited and the side airbag device 40 (airbag module 41) may be attached to the inside surface of the side frame 21.

In the above case, it is preferable that the first airbag 42 is inflation-deployed on the inside surface side of the side frame and the second airbag 43 passes through the gap G formed between the side frame 21 and the side support member 30 and is inflation-deployed on the outside surface side of the side frame 21.

Second Embodiment

Next, a conveyance seat S2 of a second embodiment will be described with reference to FIGS. 6 to 9.

It should be noted that description of content overlapping with the conveyance seat S1 described above will be omitted.

Figure 6:
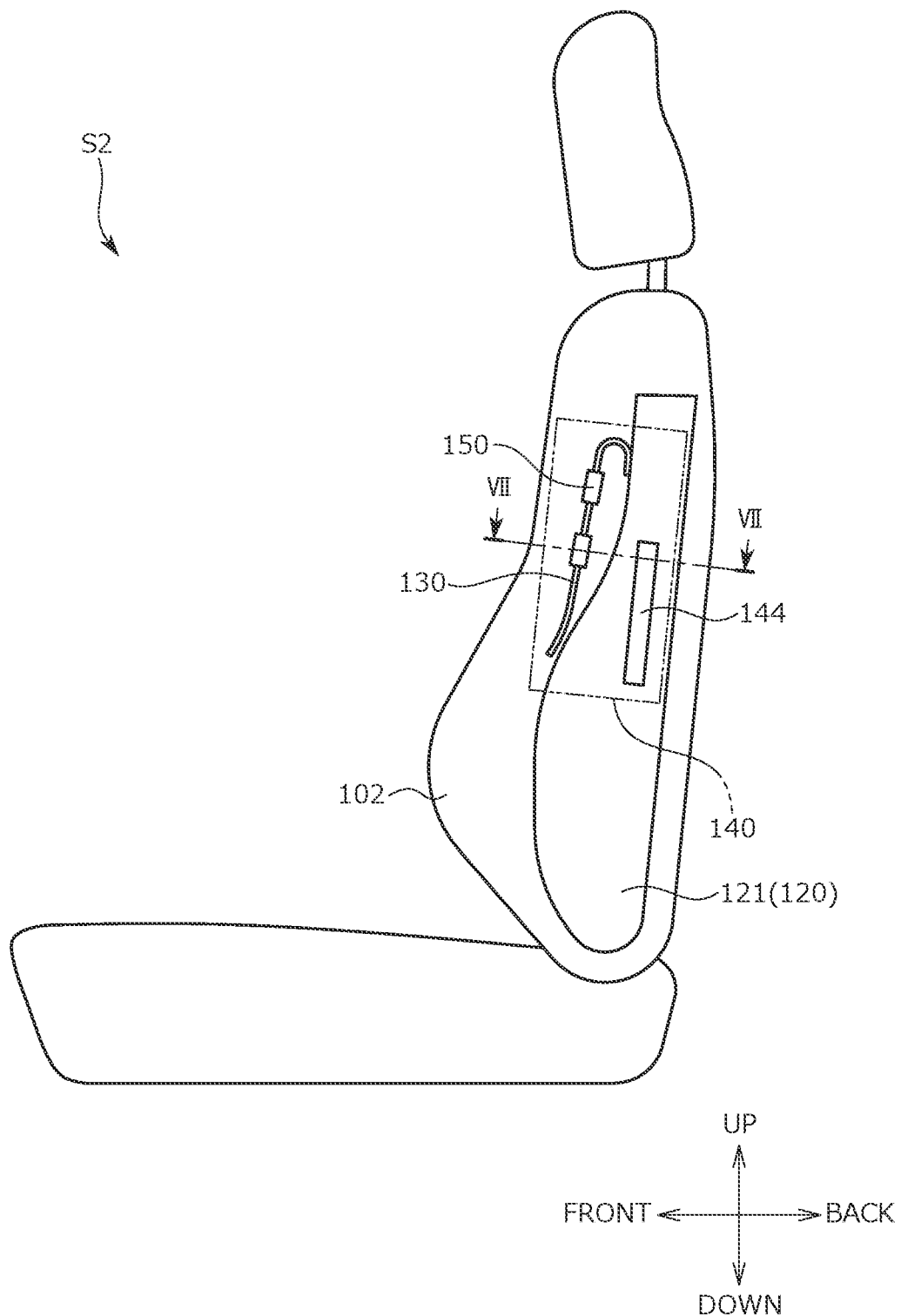
FIG. 6 is an external side view of a conveyance seat of a second embodiment.
Figure 7A:
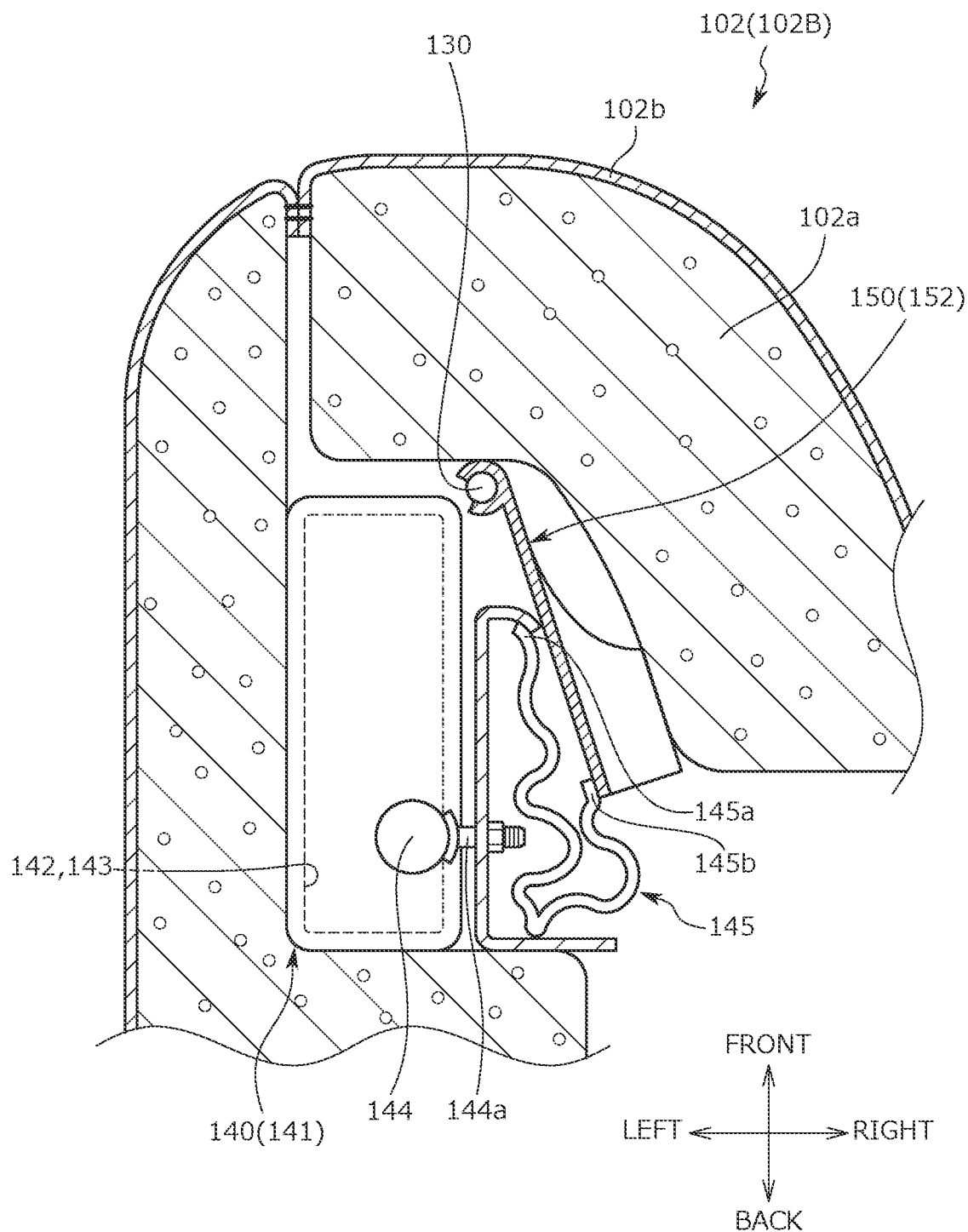
FIG. 7A is a sectional view taken along line VII-VII of FIG. 6.
Figure 7B:
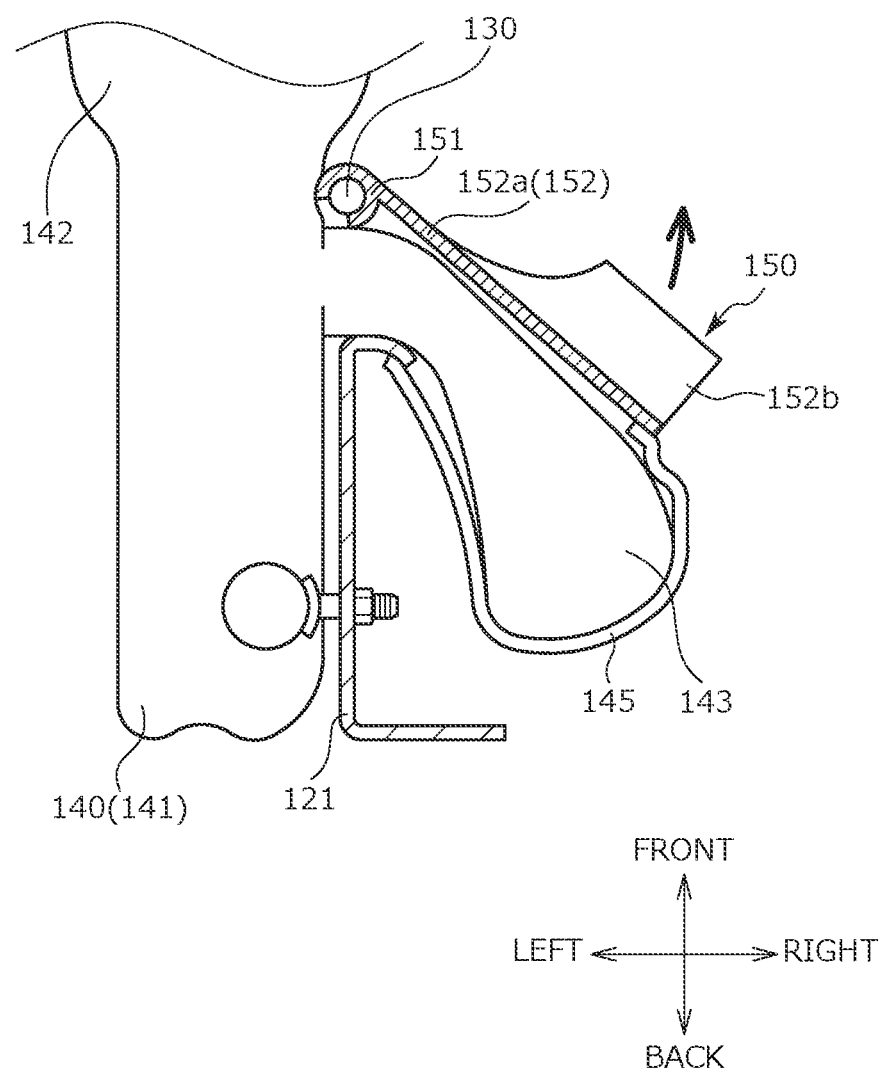
FIG. 7B is a sectional view taken along line VII-VII of FIG. 6, which illustrates a state where the first airbag and the second airbag are inflation-deployed.

As illustrated in FIGS. 6, 7A, and 7B, the conveyance seat S2 includes a seat main body having a seat back 102, a side support member 130, a side airbag device 140, and a movable body 150 attached to a side portion 102B of the seat back 102 and causing a pad material 102a of the side portion 102B to protrude to the seat front side as the airbag is inflation-deployed.

Figure 8:
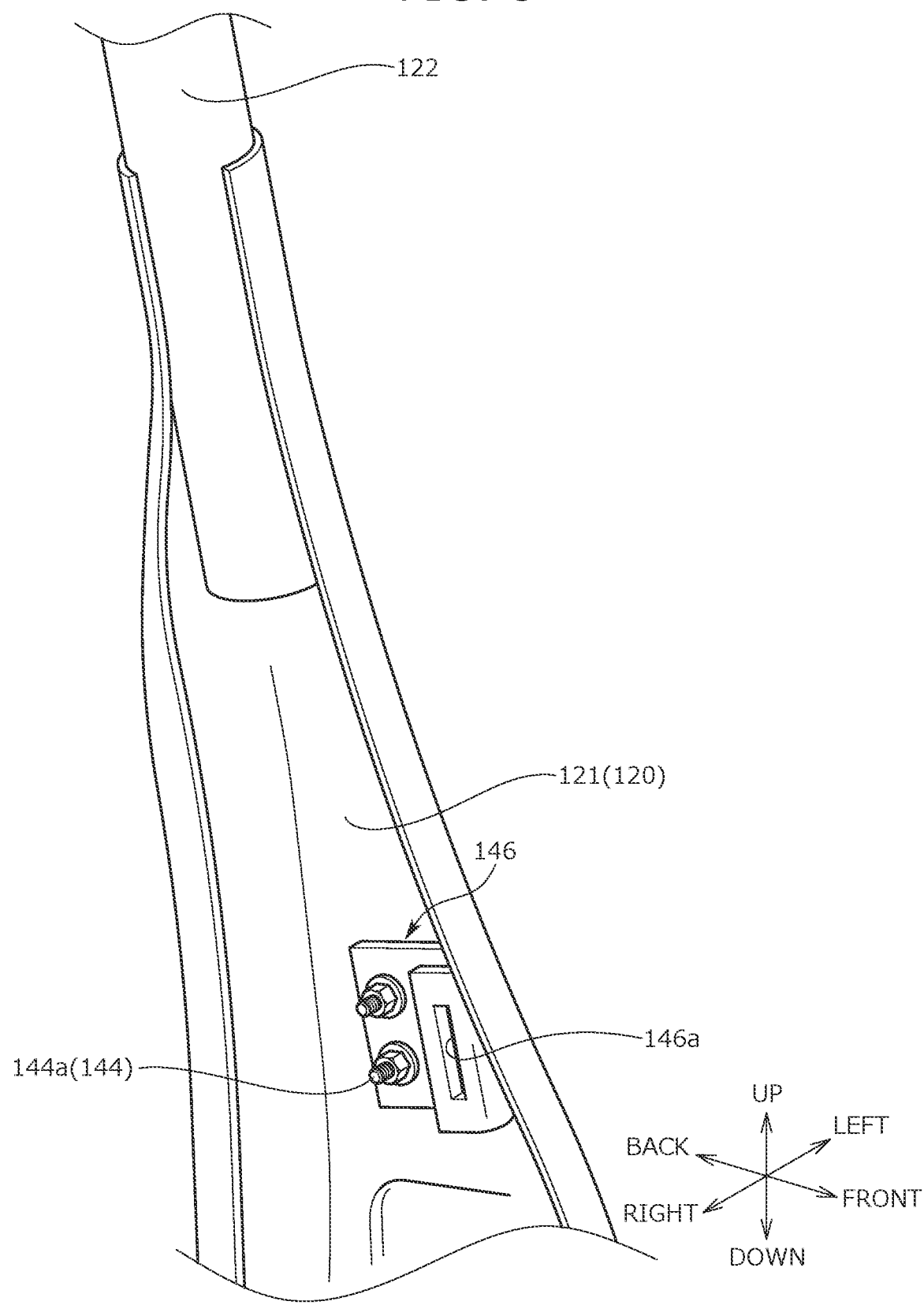
FIG. 8 is a perspective view in which the back frame is viewed from the inside in the seat width direction, which illustrates the back frame and an attachment bracket.

As illustrated in FIGS. 7A, 7B, and 8, the side airbag device 140 includes an airbag module 141 having a first airbag 142, a second airbag 143, and an inflator 144 and a guide member 145 guiding the inflation deployment of the second airbag 143.

The guide member 145 is a cloth member (stay cloth) that guides the inflation deployment direction of the second airbag 143 to the seat front side and the inside in the seat width direction. The guide member 145 may be a strap.

The guide member 145 has a configuration in which one end portion 145a of the guide member 145 is attached to the front end portion of a side frame 121, the guide member 145 extends to the seat rear continuously from the one end portion 145a, the guide member 145 is folded back near the rear end portion of the side frame 121, and the other end portion 145b of the guide member is attached to the rear end portion of the movable body 150.

Specifically, as illustrated in FIG. 8, the one end portion 145a of the guide member 145 is attached to an attachment bracket 146 attached to the inside surface of the side frame 121. In addition, as illustrated in FIGS. 7A and 7B, the other end portion 145b of the guide member 145 is attached to the back surface of the rear end portion of the movable body 150.

Preferably, the other end portion 145b is attached to the back surface of the movable body 150 with an adhesive or the like. Alternatively, a trim cord (not illustrated) made of resin may be sewn to the other end portion 145b and the other end portion 145b may be hooked on the back surface of the movable body 150 via the trim cord.

It should be noted that the other end portion 145b may be attached to the tip portion of the second airbag 143. In that case, it is preferable that the other end portion 145b is attached at the position that becomes the rear surface of the tip portion of the second airbag 143 when the second airbag 143 is inflation-deployed.

As illustrated in FIG. 8, the attachment bracket 146 is a plate body having a substantially J-shaped cross section and is fastened together with the side frame 121 by an assembly shaft 144a protruding to the inside in the seat width direction from the inflator 144.

In addition, the attachment bracket 146 has a slit 146a disposed inside the side frame 121 in the seat width direction for the one end portion 145a of the guide member 145 to be inserted therethrough and attached.

The airbag module 141 and the guide member 145 can be stably attached by the attachment bracket 146. In addition, one end portion of the guide member 145 can be attached with ease.

It should be noted that the attachment bracket 146 may be made unnecessary, and the one end portion 145a of the guide member 145 may be directly attached to the side frame 121 with an adhesive or the like.

As illustrated in FIGS. 7A and 7B, the movable body 150 is a member that protrudes to the seat front side (from a normal position to a protruding position) as the second airbag 143 is inflation-deployed and is disposed between the side frame 121 and the pad material 102a in the seat front to back direction.

The movable body 150 has a rotating member 152 attached to the side support member 130 so as to be rotatable via an attachment portion 151, rotating to the seat front side as the second airbag 143 is inflation-deployed, and causing the pad material 102a to protrude to the seat front side.

A plurality of the attachment portions 151, which are hook-shaped members, are provided at intervals along the elongation direction of the side support member 130 to sandwich the side support member 130.

The rotating member 152 has a rotating main body portion 152a rotatably attached to the side support member 130 and extending to the seat rear from the side support member 130 along the bottom surface of the pad material 102a and a plurality of protruding portions 152b (protruding ribs) protruding from the front surface of the rotating main body portion 152a toward the pad material 102a and abutting against the pad material 102a.

The rotating main body portion 152a is a plate body elongatedly extending in the up to down direction, and the plurality of protruding portions 152b are disposed at intervals along the elongation direction of the rotating main body portion 152a.

By providing the guide member 145 as described above, it is possible to prevent the inflation-deployed second airbag 143 from slipping into the seat rear beyond the side frame 121.

In addition, by providing the movable body 150 as described above, the deployment force of the second airbag 143 can be efficiently transmitted to the pad material 102a. As a result, the seated occupant can be restrained more quickly and efficiently.

Others

In the above embodiment, as illustrated in FIGS. 7A and 7B, the movable body 150 protrudes to the seat front side as the second airbag 143 is inflation-deployed and efficiently transmits the deployment force of the second airbag 143 to the pad material 102a.

At this time, a pad high-hardness portion higher in hardness than the pad material 102a may be provided at the part of the back surface of the pad material 102a that faces the movable body 150 (rotating member 152).

For example, the pad high-hardness portion may be molded integrally with the pad material 102a and may be at a part directly pressed by the movable body 150.

By doing so, the movable body 150 is capable of more efficiently transmitting the deployment force of the second airbag 143 to the pad material 102a.

Although the attachment bracket 146 in the above embodiment is attached to the inside surface of the side frame 121 as illustrated in FIG. 8, this is changeable and is not particularly limited.

Figure 9:
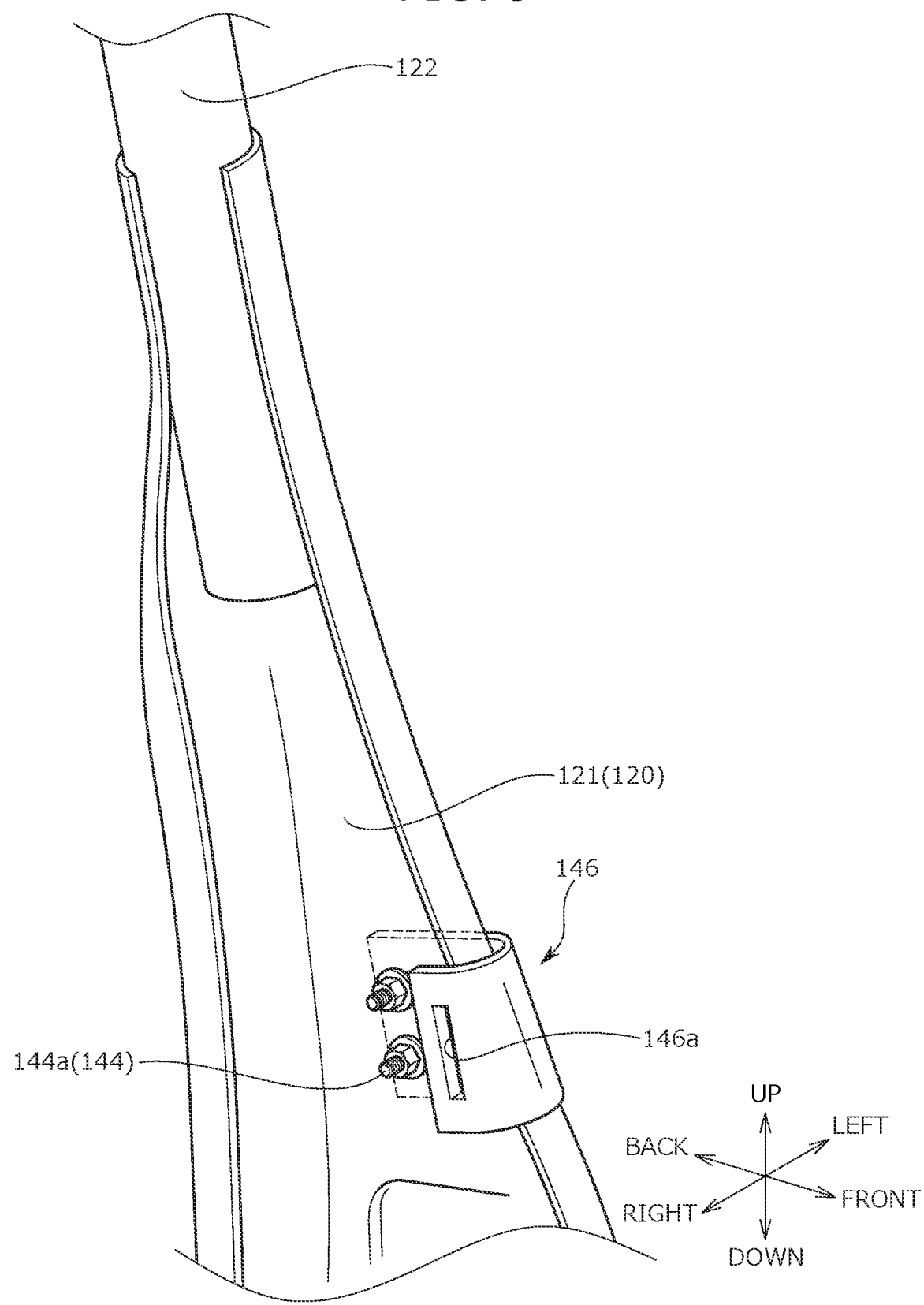
FIG. 9 is a view illustrating a modification example of the attachment bracket.
Figure 10:
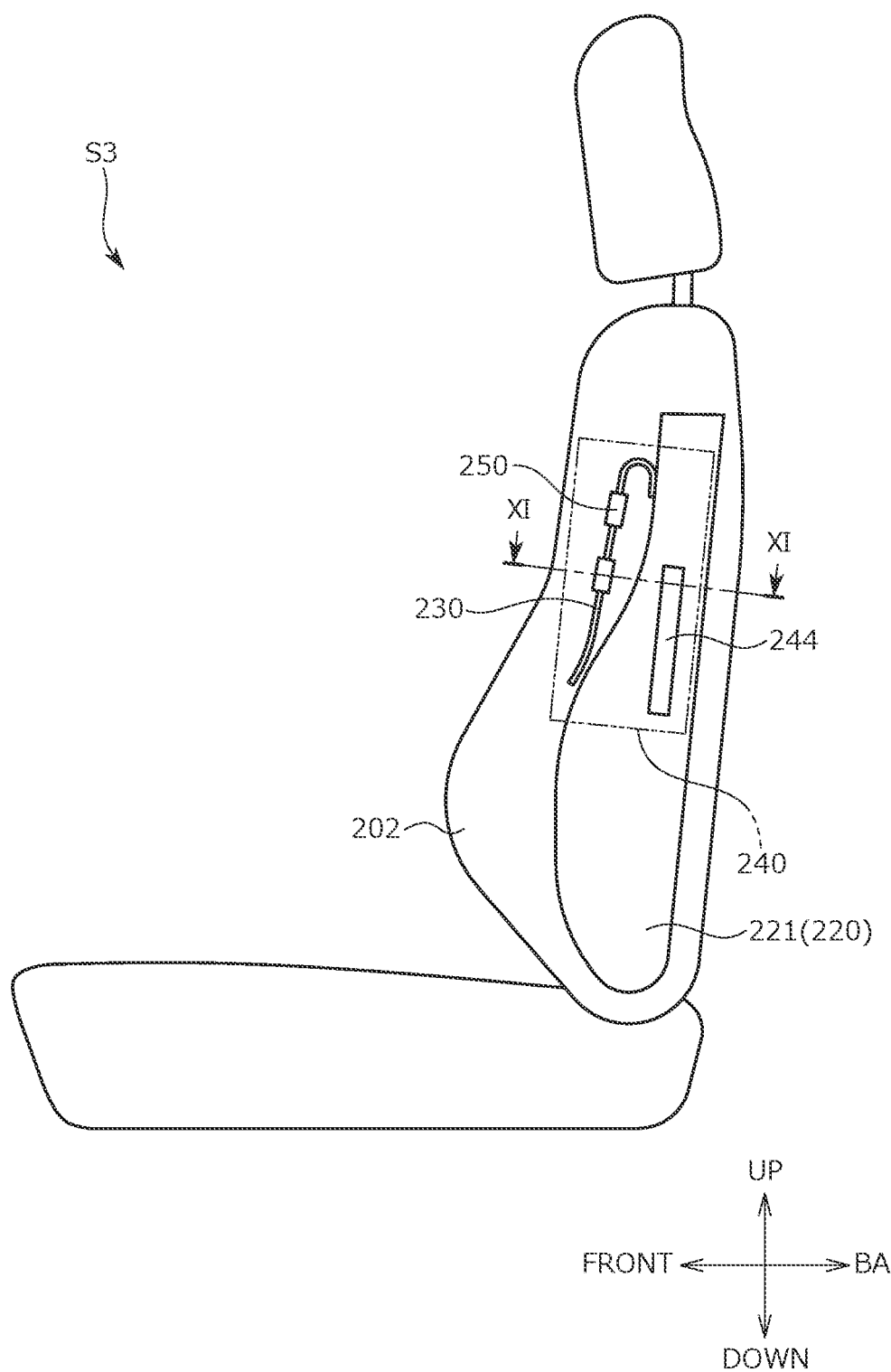
FIG. 10 is an external side view of a conveyance seat of a third embodiment.

For example, as illustrated in FIG. 9, the attachment bracket 146 may be attached to the outside surface of the side frame 121. Alternatively, the attachment bracket 146 may be attached to the front surface of the side frame 121.

Third Embodiment of Conveyance Seat

Next, a conveyance seat S3 of a third embodiment will be described with reference to FIGS. 10 to 11A and 11B.

It should be noted that description of content overlapping with the conveyance seats S1 and S2 described above will be omitted.

The conveyance seat S3 includes a seat main body having a seat back 202, a side support member 230, a side airbag device 240, and a movable body 250 attached to a side portion 202B of the seat back 202 and causing a pad material 202a of the side portion 202B to protrude to the seat front side as the airbag is inflation-deployed.

Figure 11A:
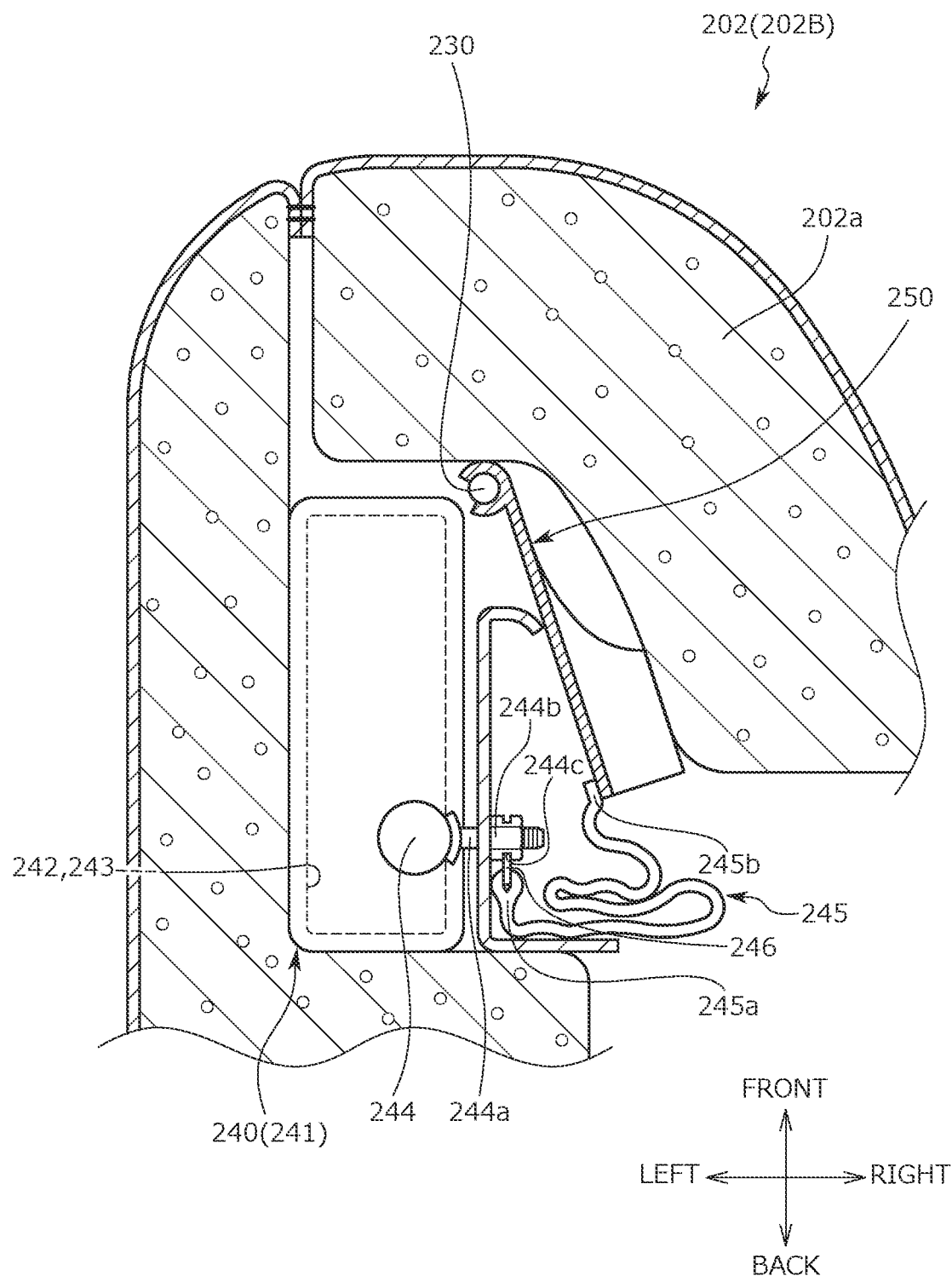
FIG. 11A is a sectional view taken along line XI-XI of FIG. 10.
Figure 11B:
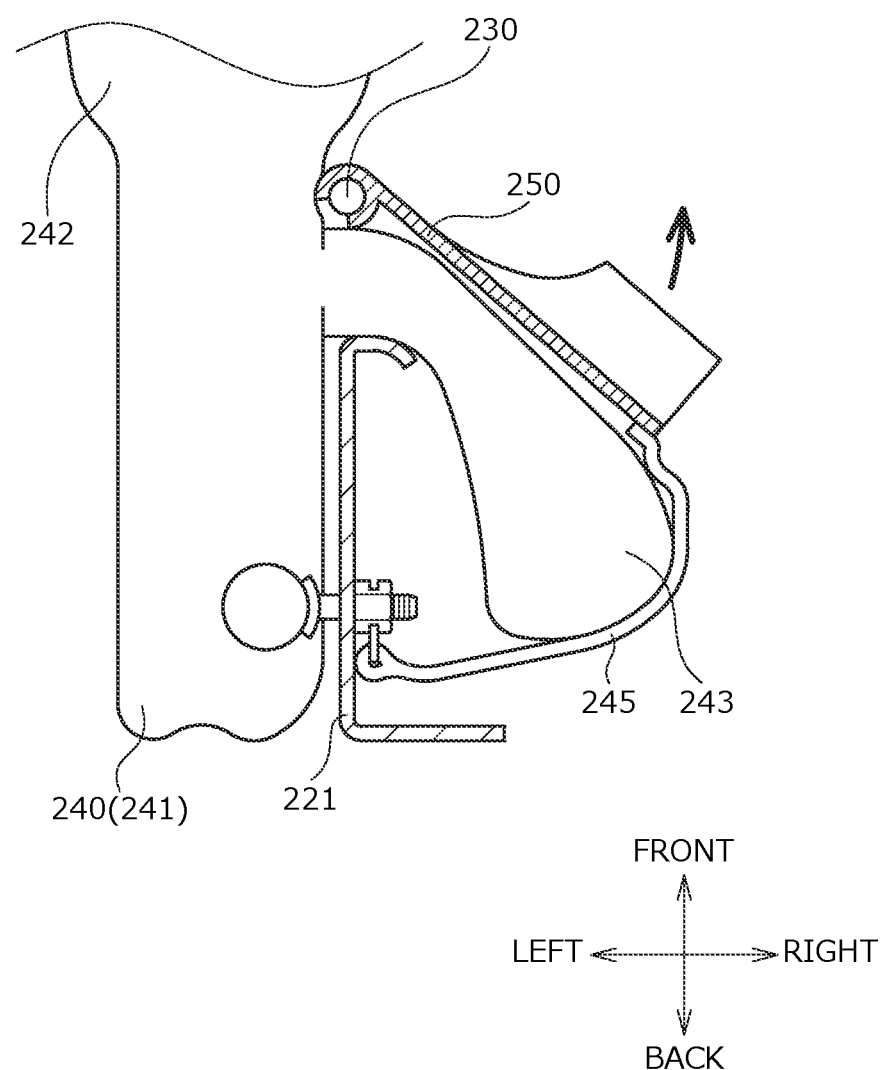
FIG. 11B is a sectional view taken along line XI-XI of FIG. 10, which illustrates a state where the first airbag and the second airbag are inflation-deployed.

As illustrated in FIGS. 11A and 11B, the side airbag device 240 includes an airbag module 241 having a first airbag 242, a second airbag 243, and an inflator 244 and a guide member 245 guiding the inflation deployment of the second airbag 243.

The airbag module 241 is attached to the outside surface of a side frame 221. Specifically, an assembly shaft 244a of the inflator 244 penetrates the side frame 221 and is fastened with an assembly nut 244b.

The guide member 245 is a stay cloth that guides the inflation deployment direction of the second airbag 243. The guide member 245 may be a strap.

A ring-shaped attachment member 246 is attached to one end portion 245a of the guide member 245.

The ring-shaped attachment member 246 is inserted into an attachment groove 244c (attached portion) formed in the outer surface of the assembly nut 244b and connected to the assembly nut 244b.

With the above configuration, the one end portion 245a of the guide member 245 is connected to the assembly nut 244b via the attachment member 246. In addition, the other end portion 245b of the guide member 245 is attached to the back surface of the movable body 250 with an adhesive or the like.

With the conveyance seat S3 described above, the airbags 242 and 243 can be inflation-deployed in a more stable state. In particular, the second airbag 243 can be inflation-deployed in a stable state on the inside surface side of the side frame 221.

Fourth Embodiment of Conveyance Seat

Next, a conveyance seat S4 of a fourth embodiment will be described with reference to FIGS. 12 to 14.

It should be noted that description of content overlapping with the conveyance seats S1 to S3 described above will be omitted.

Figure 12:
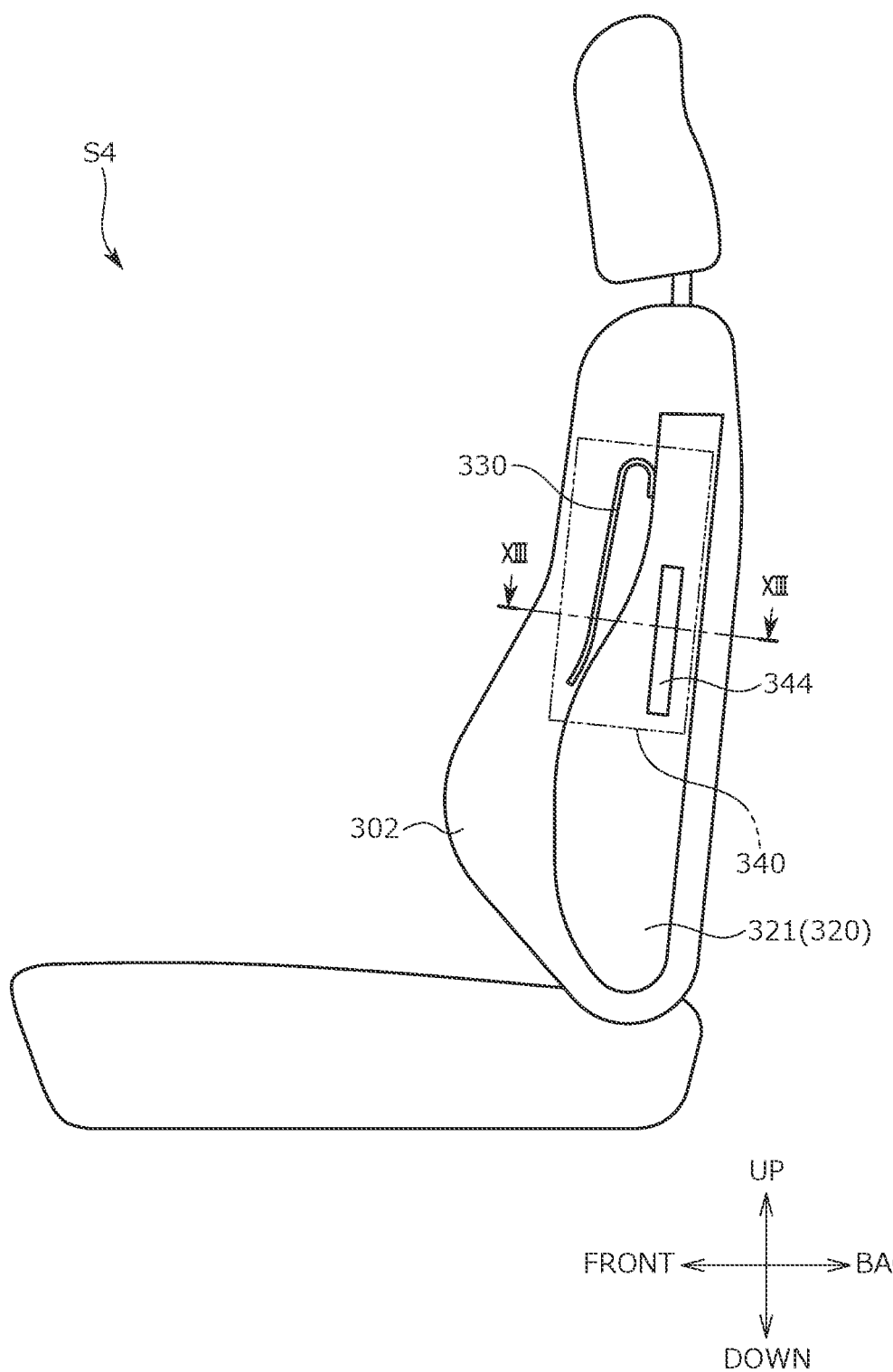
FIG. 12 is an external side view of a conveyance seat of a fourth embodiment.
Figure 13:
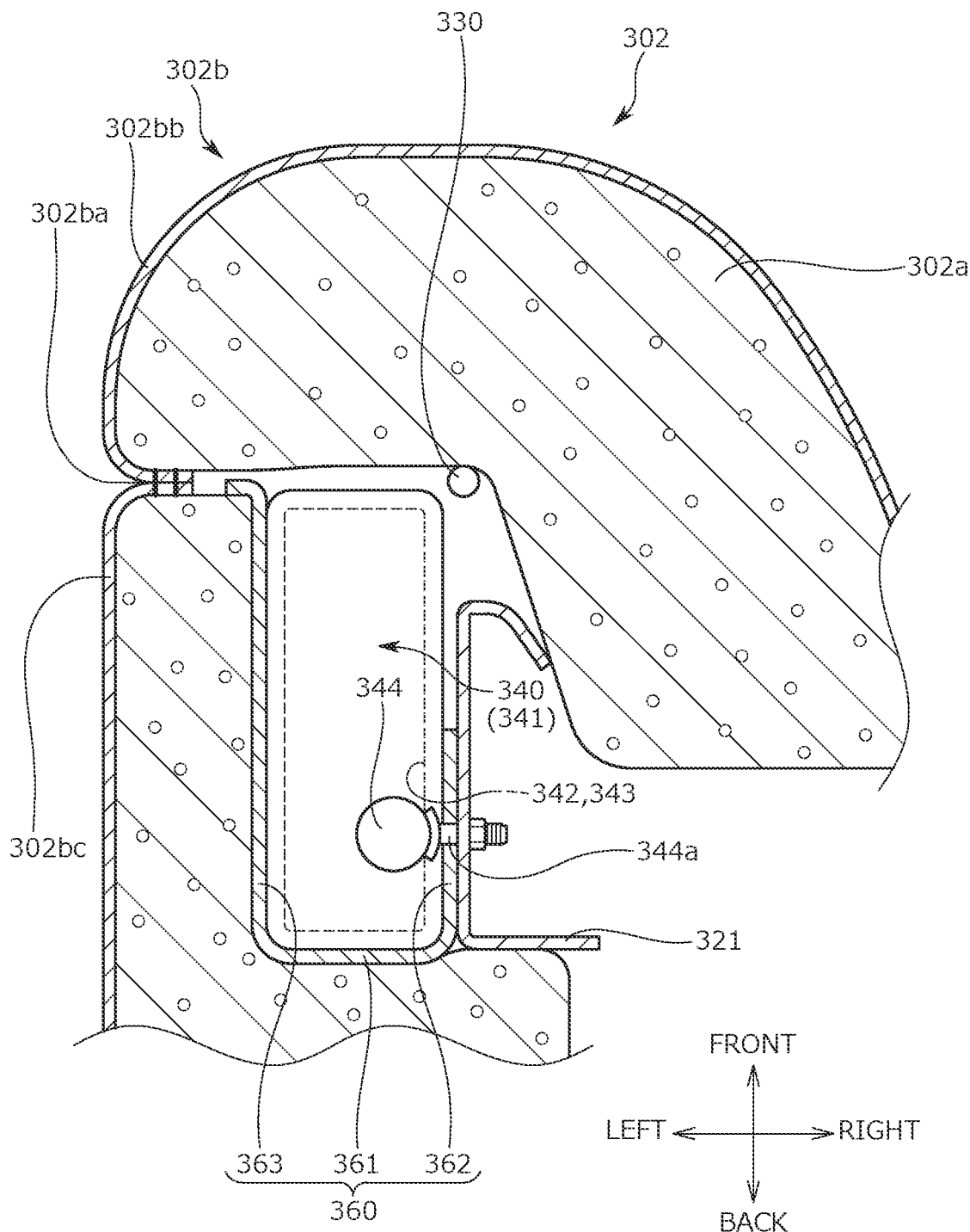
FIG. 13 is a sectional view taken along line XIII-XIII of FIG. 12.
Figure 14:
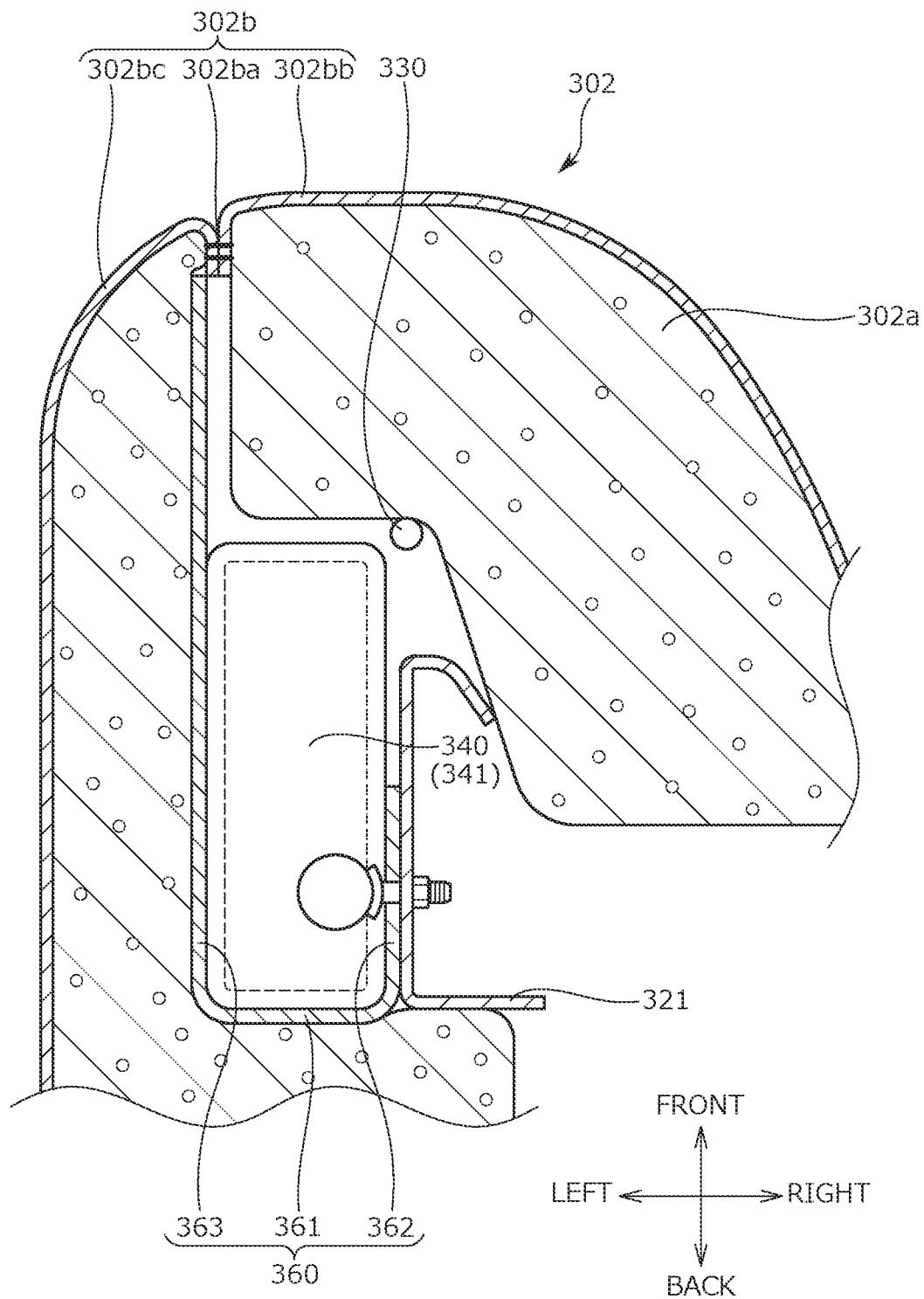
FIG. 14 is a sectional view taken along line XIII-XIII of FIG. 12, which illustrates a modification example of a retainer member.

As illustrated in FIGS. 12 and 13, the conveyance seat S4 includes a seat main body having a seat back 302, a side support member 330, a side airbag device 340 having an airbag module 341, and a retainer member 360 holding the airbag module 341 from the seat rear side.

The retainer member 360 is a holding member made of metal or resin and holding airbags 342 and 343 and an inflator 344 from the seat rear side and receives pressure entailed when the airbags 342 and 343 are inflation-deployed.

The retainer member 360 has a substantially U-shaped cross section and has a rear wall portion 361 disposed on the seat rear side of the airbag module 341 and an inside wall portion 362 and an outside wall portion 363 extending to the seat front side continuously from both end portions of the rear wall portion 361 in the seat width direction.

The inside wall portion 362 and the outside wall portion 363 respectively extend in the seat front to back direction along the side surfaces of the airbag module 341.

The inside wall portion 362 is fastened together with a side frame 321 by an assembly shaft 344a protruding to the inside in the seat width direction from the inflator 344.

The outside wall portion 363 extends to the seat front side up to a skin burst-open portion 302ba or a position reaching the vicinity of the skin burst-open portion 302ba provided at a side part of a skin material 302b and burst-opening when the first airbag 342 is inflation-deployed.

Specifically, the tip portion (front end portion) of the outside wall portion 363 is disposed at a position overlapping the skin burst-open portion 302ba in the seat front to back direction and the up to down direction (the same position).

It should be noted that the tip portion of the outside wall portion 363 may be attached to the skin burst-open portion 302ba with an adhesive or the like. Preferably, the tip portion of the outside wall portion 363 is attached to the skin burst-open portion 302ba of an outer skin material 302bc.

In addition, the tip portion of the outside wall portion 363 may be attached to the skin burst-open portion 302ba via an attachment member (attachment plate), which is not illustrated.

By providing the retainer member 360 as described above, it is possible to suitably receive pressure entailed by the inflation deployment of the airbags 342 and 343. In addition, the pressure received by the retainer member 360 can be transmitted to the skin burst-open portion 302ba to efficiently burst-open the skin burst-open portion 302ba. In addition, the retainer member 360 can be stably attached.

Modification Example 1 of Retainer Member

Next, Modification Example 1 of the retainer member 360 will be described with reference to FIG. 14.

The retainer member 360 of Modification Example 1 has a substantially U-shaped cross section and has the rear wall portion 361 disposed on the seat rear side of the airbag module 341 and the inside wall portion 362 and the outside wall portion 363 extending to the seat front side continuously from both end portions of the rear wall portion 361 in the seat width direction.

The inside wall portion 362 and the outside wall portion 363 respectively extend in the seat front to back direction along the side surfaces of the airbag module 341.

The outside wall portion 363 extends to the seat front side up to the skin burst-open portion 302ba or a position reaching the vicinity of the skin burst-open portion 302ba provided at the front end part of the skin material 302b and burst-opening when the first airbag 342 is inflation-deployed.

Specifically, the tip portion (front end portion) of the outside wall portion 363 extends to the seat front beyond the side support member 330 and is disposed at a position overlapping the skin burst-open portion 302ba in the seat front to back direction and the up to down direction (the same position).

It should be noted that the tip portion of the outside wall portion 363 may be directly attached to the skin burst-open portion 302ba or may be attached to the skin burst-open portion 302ba via an attachment member (attachment plate), which is not illustrated.

By providing the retainer member 360 as described above, it is possible to suitably receive pressure entailed by the inflation deployment of the airbags 342 and 343. In addition, the pressure received by the retainer member 360 can be transmitted to the skin burst-open portion 302ba to efficiently burst-open the skin burst-open portion 302ba.

Fifth Embodiment of Conveyance Seat

Figure 15:
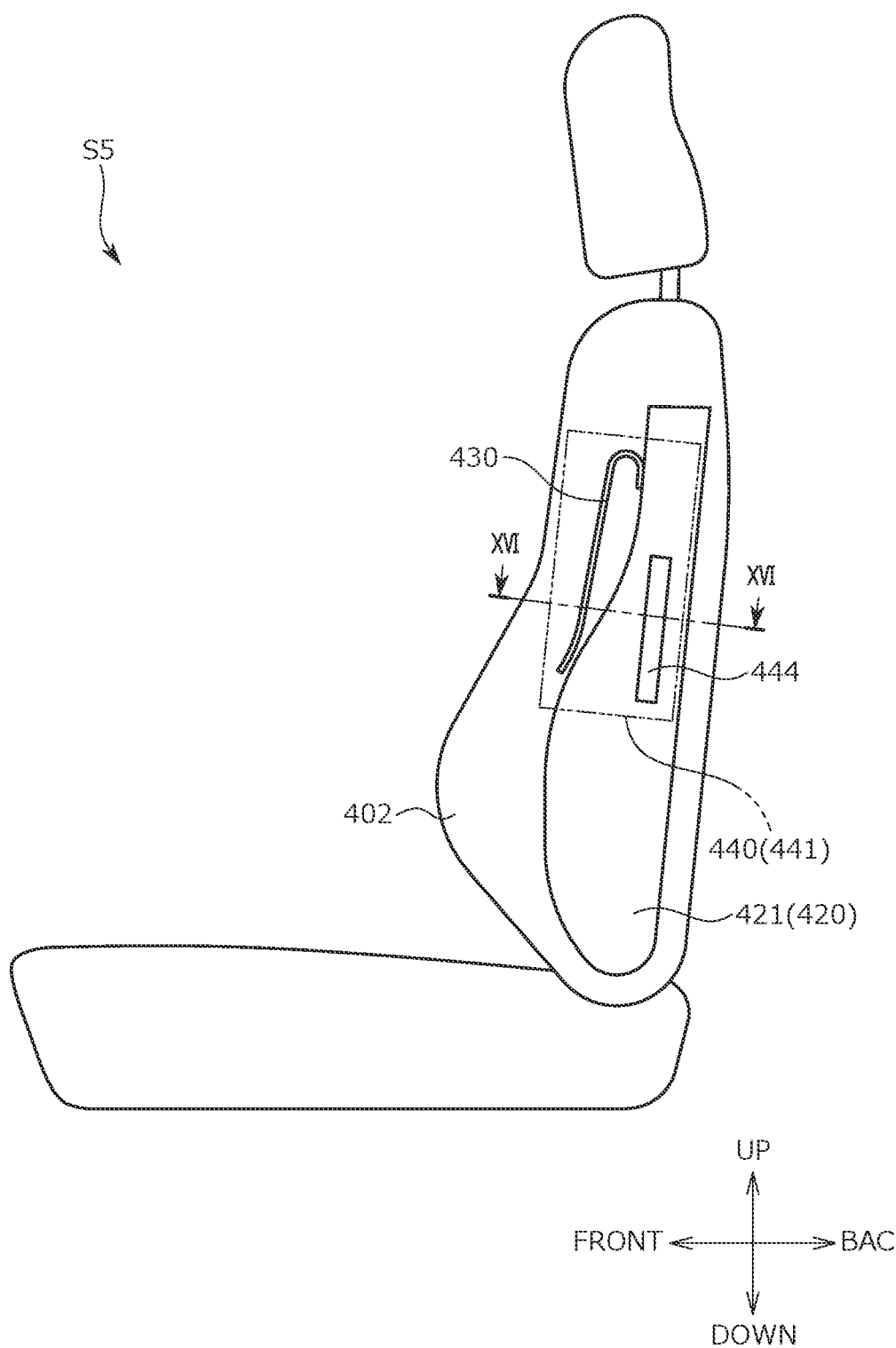
FIG. 15 is an external side view of a conveyance seat of a fifth embodiment.

Next, a conveyance seat S5 of a fifth embodiment will be described with reference to FIGS. 15 and 16.

It should be noted that description of content overlapping with the conveyance seats S1 to S4 described above will be omitted.

The conveyance seat S5 includes a seat main body having a seat back 402, a side support member 430, a side airbag device 440 having an airbag module 441, and a retainer member 460 holding the airbag module 441 from the seat rear side.

The retainer member 460 is a holding member holding airbags 442 and 443 and an inflator 444 from the seat rear side.

The retainer member 460 has a substantially L-shaped cross section and has a rear wall portion 461 disposed on the seat rear side of the airbag module 441 and an outside wall portion 463 extending to the seat front side continuously from one end portion of the rear wall portion 461 in the seat width direction.

The outside wall portion 463 extends in the seat front to back direction along a side surface of the airbag module 441.

Figure 16:
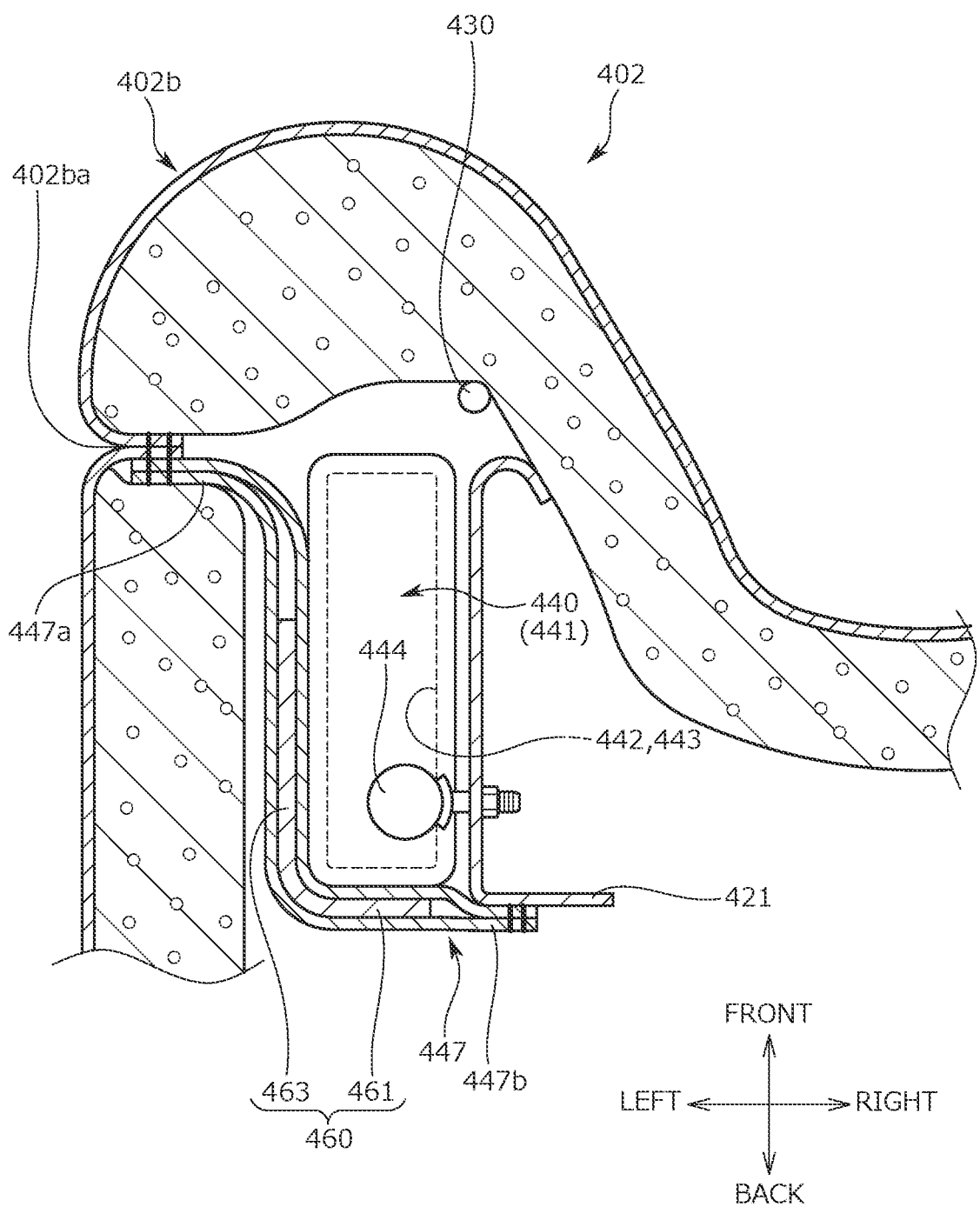
FIG. 16 is a sectional view taken along line XVI-XVI of FIG. 15.

As illustrated in FIG. 16, the retainer member 460 is attached in a state of being accommodated in a bag-shaped holder member 447.

The holder member 447 is formed by, for example, pasting two skin materials together and sewing the materials into a bag shape.

One end portion 447a of the holder member 447 in the seat width direction is connected to a skin burst-open portion 402ba provided at a side part of a skin material 402b and burst-opening when the first airbag 442 is inflation-deployed. In other words, the holder member 447 is attached integrally with the skin material 402b.

It should be noted that the one end portion 447a may extend to the seat front side up to a position reaching the vicinity of the skin burst-open portion 402ba and be connected to a predetermined position on the back surface of the skin material 402b.

The other end portion 447b of the holder member 447 in the seat width direction is attached to the back surface of the rear end portion of a side frame 421 with an adhesive or the like.

It should be noted that the other end portion 447b may be attached to the rear surface of the side frame 421 via an attachment member (attachment plate), which is not illustrated.

By providing the retainer member 460 as described above, it is possible to suitably receive pressure entailed by the inflation deployment of the airbags 442 and 443.

In addition, the retainer member 460 can be stably attached by providing the holder member 447.

Sixth Embodiment of Conveyance Seat

Next, a conveyance seat S6 of a sixth embodiment will be described with reference to FIGS. 17 and 18.

It should be noted that description of content overlapping with the conveyance seats S1 to S5 described above will be omitted.

The conveyance seat S6 includes a seat main body having a seat back 502, a side support member 530, a side airbag device 540 having an airbag module 541, and a retainer member 560 holding the airbag module 541 from the seat rear side.

Figure 17:
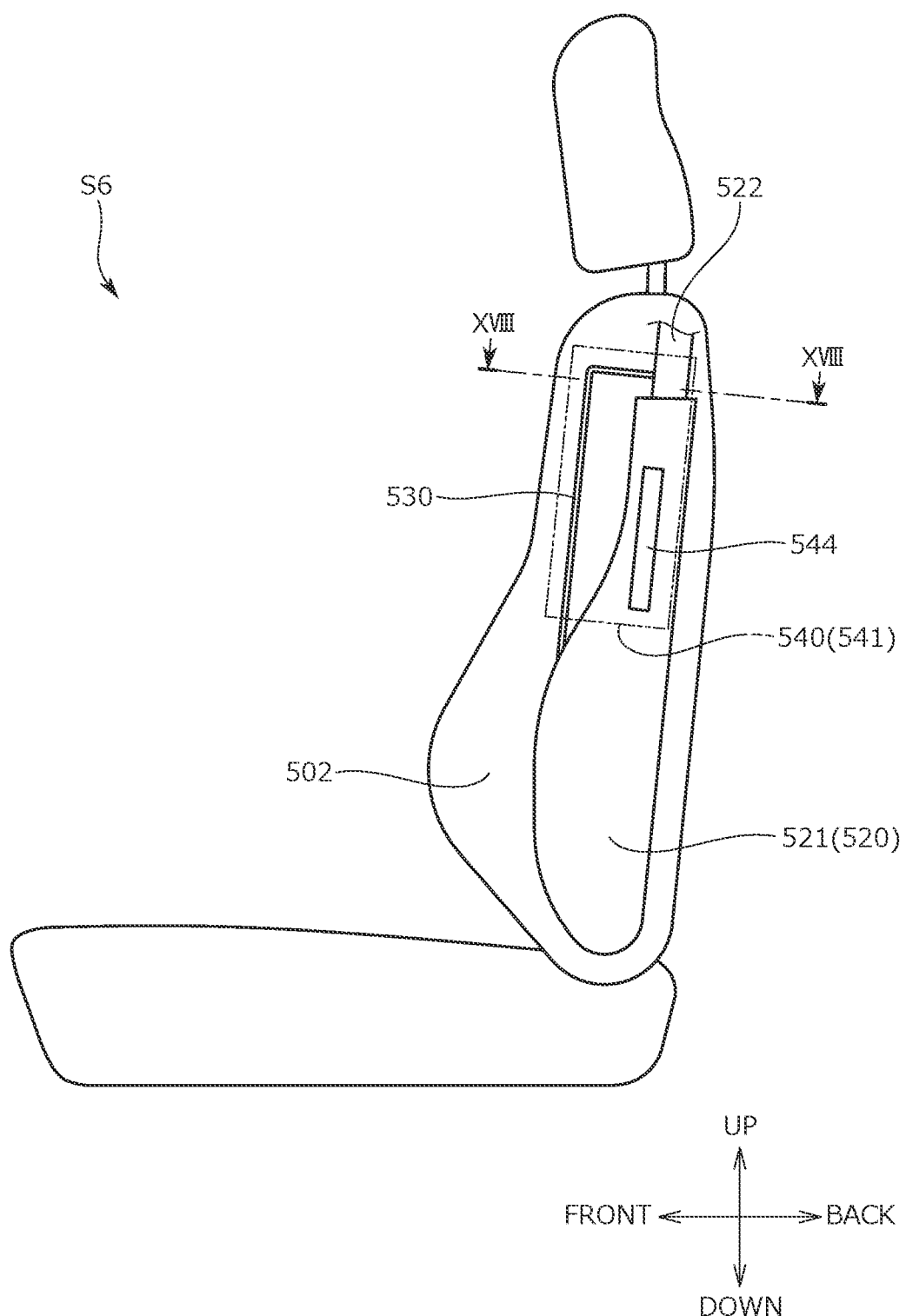
FIG. 17 is an external side view of a conveyance seat of a sixth embodiment.

As illustrated in FIG. 17, the airbag module 541 is attached to the upper part of the seat back 502 and disposed so as to straddle a side frame 521 and an upper frame 522 in the up to down direction.

Figure 18:
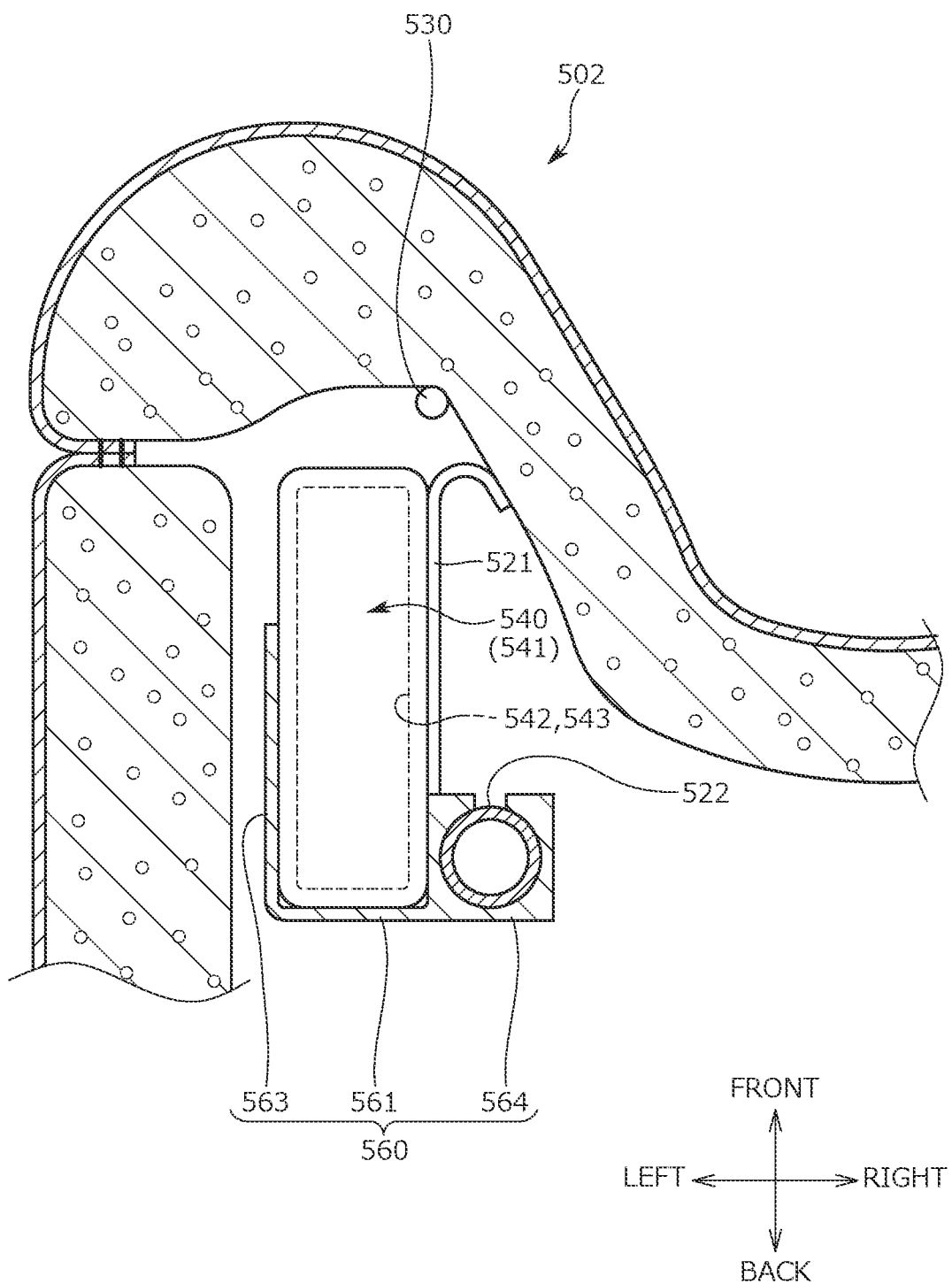
FIG. 18 is a sectional view taken along line XVIII-XVIII of FIG. 17.

As illustrated in FIG. 18, the retainer member 560 is a holding member holding airbags 542 and 543 and an inflator 544 from the seat rear side, is disposed at a position above the side frame 521, and is disposed at the same height position as the lower end part of the upper frame 522.

The retainer member 560 has a substantially U-shaped cross section and has a rear wall portion 561 disposed on the seat rear side of the airbag module 541, an outside wall portion 563 extending to the seat front side continuously from one end portion (outside end portion) of the rear wall portion 561 in the seat width direction, and a frame attachment portion 564 protruding to the seat front side from the other end portion (inside end portion) of the rear wall portion 561 in the seat width direction and attached to the upper frame 522.

The frame attachment portion 564 is a hook member having a substantially C-shaped cross section and can be attached so as to sandwich the pipe-shaped upper frame 522 from the seat rear.

It should be noted that the frame attachment portion 564 is not limited to a hook shape and may have any shape insofar as the frame attachment portion 564 can be attached to the upper frame 522. The frame attachment portion 564 may be attached to the upper frame 522 with an adhesive or the like.

By providing the retainer member 560 as described above, it is possible to suitably receive pressure entailed by the inflation deployment of the airbags 542 and 543.

In addition, the retainer member 560 can be stably attached by providing the frame attachment portion 564.

Seventh Embodiment of Conveyance Seat

Figure 19:
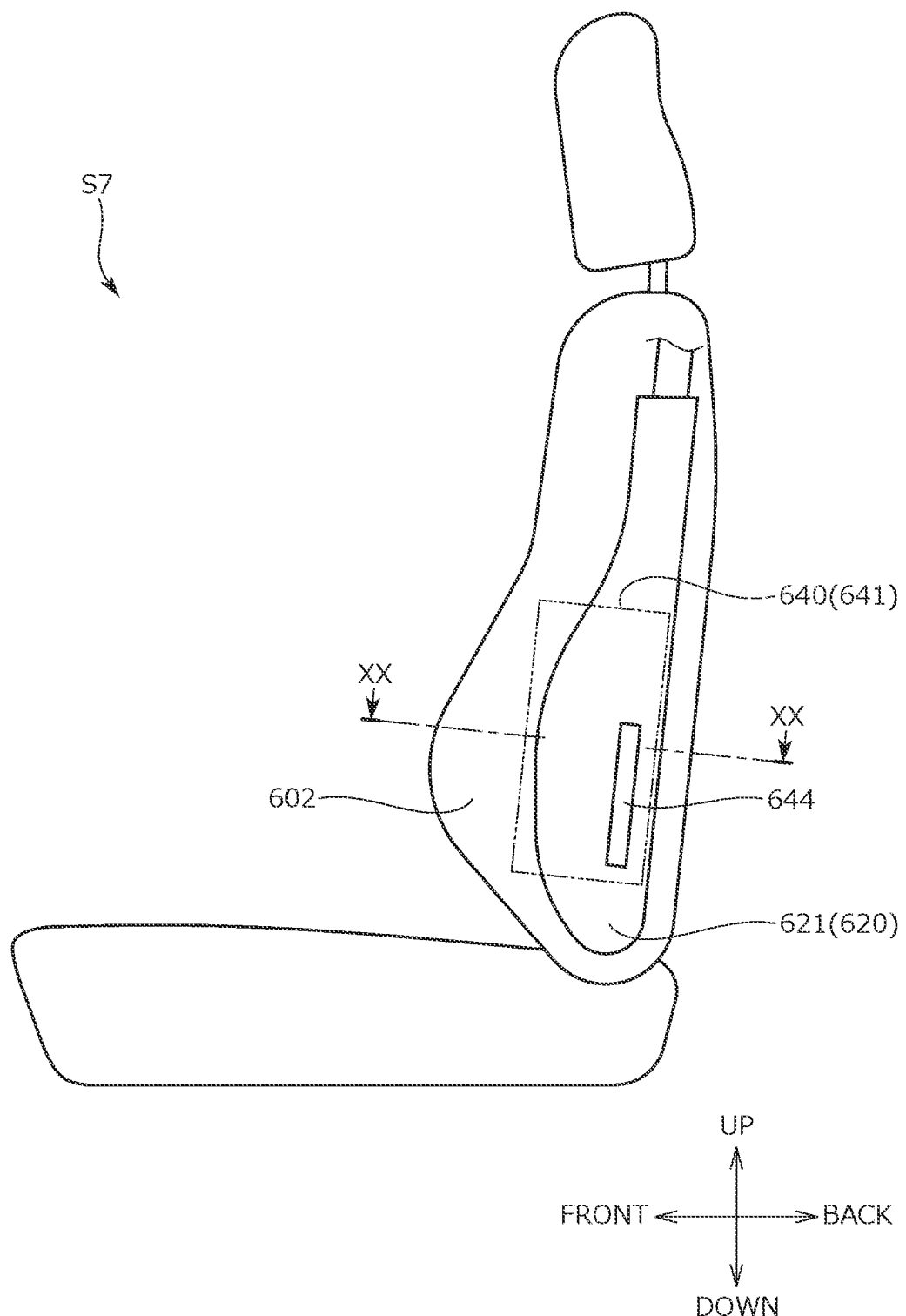
FIG. 19 is an external side view of a conveyance seat of a seventh embodiment.

Next, a conveyance seat S7 of a seventh embodiment will be described with reference to FIGS. 19 to 21.

It should be noted that description of content overlapping with the conveyance seats S1 to S6 described above will be omitted.

The conveyance seat S7 includes a seat main body having a seat back 602, a side airbag device 640 having an airbag module 641, and a retainer member 670 holding the airbag module 641 from the seat rear side.

Figure 20:
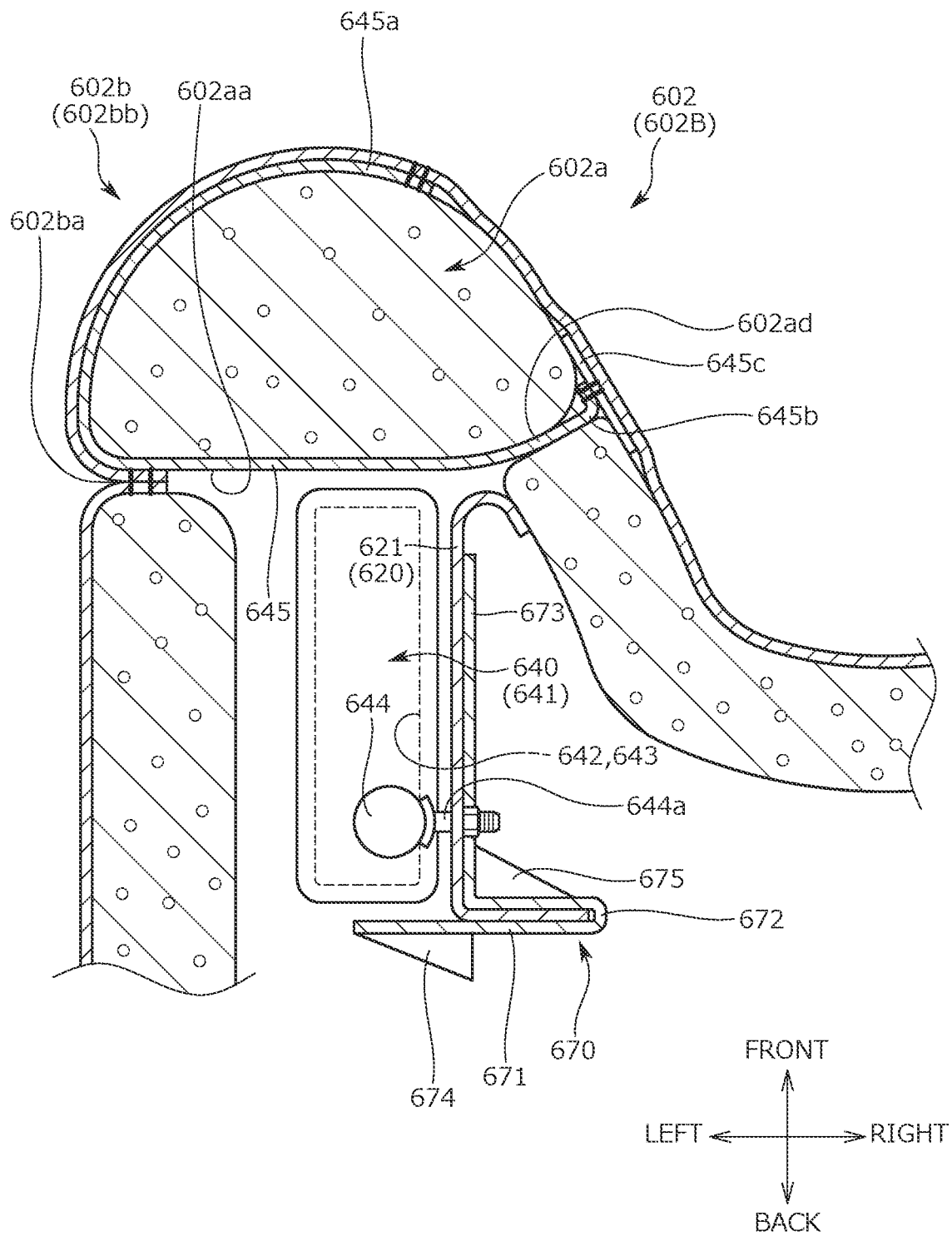
FIG. 20 is a sectional view taken along line XX-XX of FIG. 19.
Figure 21:
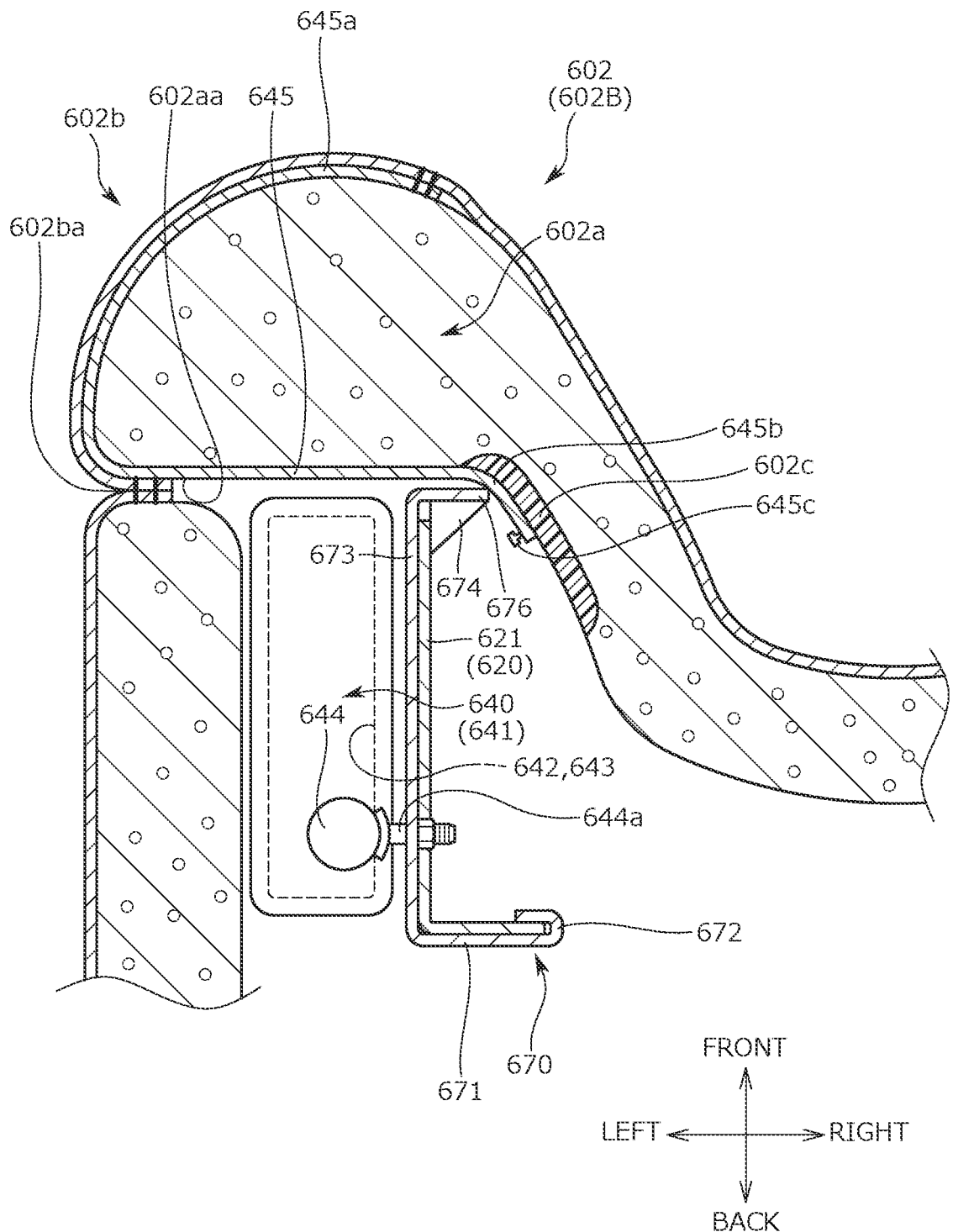
FIG. 21 is a sectional view taken along line XX-XX of FIG. 19, which illustrates modification examples of the retainer member and a guide member.

As illustrated in FIG. 20, the seat back 602 includes a pad material 602*a* disposed on the front surface of a back frame 620 and a skin material 602*b* covering the back frame 620 and the pad material 602*a*.

The pad material 602*a* has pad through holes 602*aa* and 602*ad* formed at positions in front of the airbag module 541 in a side portion 602B of the seat back 602 and penetrating the pad material 602*a* from the outside surface to the inside surface.

The skin material 602*b* has a skin burst-open portion 602*ba* burst-opening during the inflation deployment of airbags 642 and 643 on the outside surface of the side portion 602B.

As illustrated in FIG. 20, the side airbag device 640 includes the airbag module 641 having the first airbag 642, the second airbag 643, and an inflator 644 and a guide member 645 guiding the inflation deployment of the airbags 642 and 643.

The airbag module 641 is attached to the outside surface of a side frame 621. Specifically, an assembly shaft 644*a* of the inflator 644 penetrates the side frame 621 and a retainer member 660 and is fastened with an assembly nut.

It should be noted that the side airbag device 640 may not have the second airbag 643.

The guide member 645 is a stay cloth that guides the inflation deployment directions of the airbags 642 and 643. The guide member 645 may be a strap.

One end portion 645*a* of the guide member 645 is attached by sewing to the back surface of the front end portion of the skin material 602*b* (specifically, an inner skin material 602*bb*).

The guide member 645 extends from the one end portion 645*a* to the seat rear so as to cover the pad material 602*a* (specifically, the pad material 602*a* of the side portion 602B) from the outside and further extends so as to pass through the pad through hole 602*aa* of the pad material 602*a*.

The other end portion 645*b* of the guide member 645 passes between the pad material 602*a* and the airbag module 641 in the seat front to back direction, extends toward the inside in the seat width direction, and passes through the pad through hole 602*ad*. Then, the other end portion 645*b* is attached to the back surface of the inside end portion in the seat width direction of the side portion 602B of the skin material 602*b*.

A plate-shaped attachment member 645*c* (for example, a trim cord made of resin) is sewn to the other end portion 645*b* of the guide member 645. Further, the other end portion 645*b* is hooked so as to be sandwiched between the pad material 602*a* and the skin material 602*b* via the attachment member 645*c*.

Specifically, the attachment member 645*c* is folded when the other end portion 645*b* of the guide member 645 is passed through the pad through hole 602*aa*. Further, in hooking the other end portion 645*b*, the attachment member 645*c* is raised (raised so as to form a T shape) and hooked in the space between the pad material 602*a* and the skin material 602*b*.

By providing the guide member 645 as described above, it is possible to suitably guide the deployment direction of the side portion 602B of the seat back 602 when the airbag is inflation-deployed. As a result, the airbag can be deployed with speed.

In addition, the guide member 645 can be easily attached by providing the attachment member 645*c*.

As illustrated in FIG. 20, the retainer member 670 is a holding member having a substantially T-shaped cross section and holding the airbag module 641 from the seat rear side and is attached to the side frame 621.

The retainer member 670 has a rear wall portion 671 disposed on the seat rear side of the airbag module 641 and the side frame 621, a folded-back wall portion 672 formed by folding back the right end portion of the rear wall portion 671 and extending to the outside in the seat width direction along the rear end portion (rear flange portion 621*c*) of the side frame 621, and a side wall portion 673 bent from the extending end portion of the folded-back wall portion 672 and extending to the seat front along the inside surface of the side frame 621.

The retainer member 670 is attached to the side frame 621 from the inside in the seat width direction and is attached so as to sandwich a part (rear flange portion 621*c*) of the side frame 621.

In addition, the retainer member 670 (side wall portion 673) is fastened together with the side frame 621 by the assembly shaft 644*a* provided on the inflator 644 and protruding from the inflator 644 toward the inside in the seat width direction.

The retainer member 670 further has a first reinforcement portion 674 attached to the rear surface of the rear wall portion 671 and protruding to the seat rear and a second reinforcement portion 675 attached to the connection part between the folded-back wall portion 672 and the side wall portion 673 and protruding from the side wall portion 673 to the inside in the seat width direction.

Each of the first reinforcement portion 674 and the second reinforcement portion 675 is a reinforcement rib (screen portion) having a substantially triangular section and disposed at a position corresponding to the airbag module 641.

Specifically, the first reinforcement portion 674 is disposed at a position overlapping the airbag module 641 in the seat width direction and the up to down direction (the same position) and protrudes in a direction away from the airbag module 641.

The second reinforcement portion 675 is disposed at a position overlapping the airbag module 641 in the seat front to back direction and the up to down direction (the same position) and protrudes in a direction away from the airbag module 641.

Each of the first reinforcement portion 674 and the second reinforcement portion 675 is disposed at a position close to the inflator 644 and disposed so as to surround the inflator 644.

By providing the retainer member 670 as described above, it is possible to suitably receive pressure entailed by the inflation deployment of the airbags 642 and 643.

Modification Example 1 of Guide Member

Next, Modification Example 1 of the guide member 645 will be described with reference to FIG. 21.

The guide member 645 is a stay cloth that guides the inflation deployment directions of the airbags 642 and 643.

The one end portion 645*a* of the guide member 645 is attached by sewing to the back surface of the front end portion of the skin material 602*b*.

The guide member 645 extends from the one end portion 645*a* to the seat rear so as to cover the pad material 602*a* from the outside and further extends so as to pass through the pad through hole 602*aa* of the pad material 602*a*.

The other end portion 645*b* of the guide member 645 passes between the pad material 602*a* and the airbag module 641 in the seat front to back direction and extends toward the inside in the seat width direction. Then, the other end portion 645*b* is attached to the back surface of the inside portion in the seat width direction of the side portion 602B of the pad material 602*a*.

Specifically, the other end portion 645*b* of the guide member 645 is attached to the back surface of the pad material 602*a* by the attachment member 645*c* (specifically, an attachment pin).

At this time, a pad high-hardness portion 602*c* higher in hardness than the pad material 602*a* is provided at the part of the back surface of the pad material 602*a* that faces the other end portion 645*b*.

The pad high-hardness portion 602*c* is molded integrally with the pad material 602*a* on the back surface of the pad material 602*a*.

By providing the guide member 645 as described above, it is possible to suitably guide the deployment direction of the side portion 602B of the seat back 602 when the airbag is inflation-deployed.

In addition, the guide member 645 can be easily attached by providing the attachment member 645*c* and the pad high-hardness portion 602*c*.

Modification Example 2 of Retainer Member

Next, Modification Example 2 of the retainer member 670 will be described with reference to FIG. 21.

The retainer member 670 of Modification Example 2 is a holding member having a substantially C-shaped cross section and holding the airbag module 641 from a seat lateral side and is attached to the side frame 621.

The retainer member 670 has the rear wall portion 671 disposed on the seat rear side of the side frame 621, the folded-back wall portion 672 formed by folding back the right end portion of the rear wall portion 671 and sandwiching the rear end portion (rear flange portion 621*c*) of the side frame 621, the side wall portion 673 bent from the left end portion of the rear wall portion 671 and extending to the seat front along sides of the airbag module 641 and the side frame 621, and a front wall portion 676 bent from the front end portion of the side wall portion 673 and protruding to the inside in the seat width direction.

The retainer member 670 is attached to the side frame 621 from the outside in the seat width direction and is attached so as to sandwich a part (rear flange portion 621*c*) of the side frame 621.

The retainer member 670 is disposed between the side frame 621 and the airbag module 641 in the seat width direction.

Specifically, the retainer member 670 (side wall portion 673) is fastened together with the side frame 621 by the assembly shaft 644*a* provided on the inflator 644 and protruding from the inflator 644 toward the inside in the seat width direction.

The retainer member 670 further has the reinforcement portion 674 attached to the connection part between the side wall portion 673 and the front wall portion 676 and protruding from the side wall portion 673 to the inside in the seat width direction.

The reinforcement portion 674 is a reinforcement rib (screen portion) having a substantially triangular section and disposed at a position corresponding to the airbag module 641.

Specifically, the reinforcement portion 674 is disposed at a position overlapping the airbag module 641 in the seat front to back direction and the up to down direction (the same position) and protrudes in a direction away from the airbag module 641.

The reinforcement portion 674 is disposed at a position close to the inflation deployment starting point positions of the airbags 642 and 643.

By providing the retainer member 670 as described above, it is possible to suitably receive pressure entailed by the inflation deployment of the airbags 642 and 643.

Eighth Embodiment of Conveyance Seat

Figure 22:
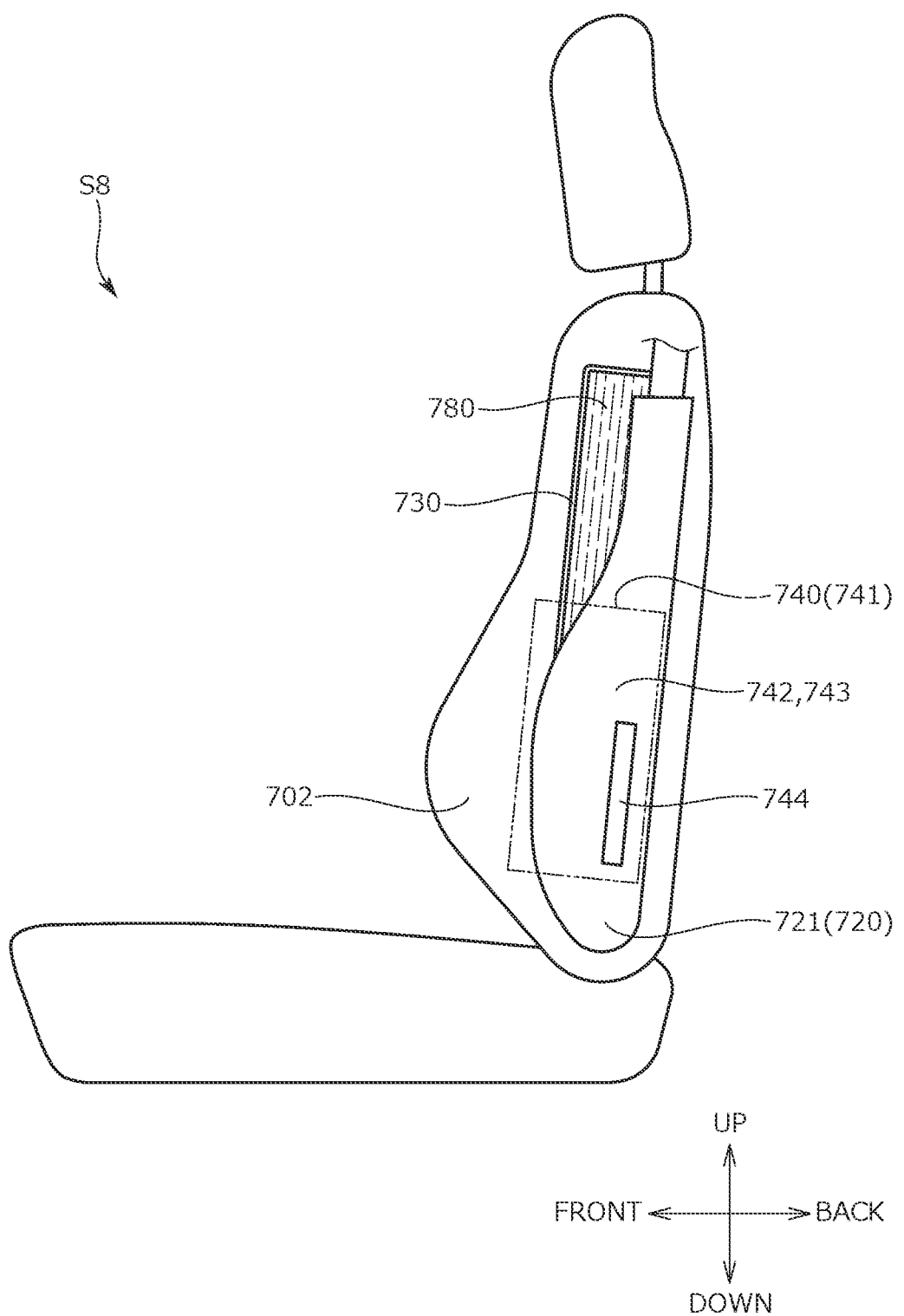
FIG. 22 is an external side view of a conveyance seat of an eighth embodiment.

Next, a conveyance seat S8 of an eighth embodiment will be described with reference to FIG. 22.

It should be noted that description of content overlapping with the conveyance seats S1 to S7 described above will be omitted.

The conveyance seat S8 includes a seat main body having a seat back 702, side support members 730, a side airbag device 740, and a guide member 780 disposed between the side support member 730 and a side frame 721 in the seat front to back direction and guiding the inflation deployment directions of airbags 742 and 743.

The side support members 730 are L-shaped linear members (specifically, wire members) and are attached by welding to the seat front parts of the right and left side frames 21.

The side airbag device 740 includes an airbag module 741 having the first airbag 742, the second airbag 743, and an inflator 744.

It should be noted that the side airbag device 740 may have only the first airbag 742 without having the second airbag 743.

The guide member 780 is a plate-shaped member elongated in the up to down direction, is attached to the side support member 730, and is disposed so as to cover the gap between the side support member 730 and the side frame 721 in the seat front to back direction.

Specifically, the guide member 780 is hooked on the side support member 730 by a plurality of attachment members (for example, attachment clips), which are not illustrated.

It should be noted that the guide member 780 may be attached to, for example, the side frame 721.

By providing the guide member 780 as described above, it is possible to suitably guide the inflation deployment direction of the side portion of the seat back 702 when the airbag is inflation-deployed. As a result, the airbag can be deployed with speed.

In addition, the guide member 780 can be easily attached using the side support member 730.

Although a vehicle seat used in an automobile has been described as a specific example in the above embodiments, the present invention is not particularly limited and can also be used for various seats such as two-wheeled seats for two-wheeled vehicles, seats for vehicles such as trains and buses, and seats for conveyances such as airplanes and ships.

In the above embodiments, the conveyance seat according to the present invention has been mainly described.

However, the above embodiments are merely examples for facilitating understanding of the present invention and do not limit the present invention. The present invention can be modified and improved without departing from the spirit thereof, and it is a matter of course that the present invention includes equivalents thereof.

REFERENCE SIGNS LIST

S1 to S8: conveyance seat
1: seat cushion
   1A: middle portion
   1B: side portion
   1a: pad material
   1b: skin material
2, 102, 202, 302, 402, 502, 602, 702: seat back
   2A: middle portion
   2B, 102B, 202B, 602B: side portion
   2a, 102a, 202a, 302a, 602a: pad material
      2aa, 602aa, 602ad: pad through hole
      2ab: inner pad
      2ac: outer pad
   2b, 102b, 302b, 402b, 602b: skin material
      2ba, 302ba, 402ba, 602ba: skin burst-open portion
      2bb, 302bb, 602bb: inner skin material
      2bc, 302bc, 602bc: outer skin material
   602c: pad high-hardness portion
3: headrest
   3a: pad material
   3b: skin material
   3c: pillar
4: reclining device
5: height link device
6: rail device
10: cushion frame
11: cushion side frame
12: pan frame
13: rear connection frame
14: support member (elastic spring)
20, 120, 220, 320, 420, 520, 620, 720: back frame
21, 121, 221, 321, 421, 521, 621, 721: side frame
   21a, 621a: frame main body portion
   21b, 621b: front flange portion
   21c, 621c: rear flange portion
22, 522: upper frame
23: lower frame
24: wire member (elastic wire)
25: support plate
26: pillar attachment member
27: protective member (protective plate)
   27a: plate main body portion
   27b: plate front portion
   27c: plate rear portion
28: second protective member (protective cap)
30, 130, 230, 330, 430, 530, 730: side support member
31: wire main body portion
32: wire extending portion
40, 140, 240, 340, 440, 540, 640, 740: side airbag device
41, 141, 241, 341, 441, 541, 641, 741: airbag module
42, 142, 242, 342, 442, 542, 642, 742: first airbag
43, 143, 243, 343, 443, 543, 643, 743: second airbag
44, 144, 244, 344, 444, 544, 644, 744: inflator
   44a, 144a, 244a, 644a: assembly shaft
   44b, 244b: assembly nut
   244c: attachment groove
145, 245, 645: guide member
   145a, 245a, 645a: one end portion
   145b, 245b, 645b: the other end portion
   645c: attachment member
146, 246: attachment bracket, attachment member
   146a: slit
447: holder member
   447a: one end portion
   447b: the other end portion
150, 250: movable body
151: attachment portion
152: rotating member
   152a: rotating main body portion
   152b: protruding portion (protruding rib)
360, 460, 560: retainer member
361, 461, 561: rear wall portion
362: inside wall portion
363, 463, 563: outside wall portion
564: frame attachment portion
670, 770: retainer member
671: rear wall portion
672: folded-back wall portion
673: side wall portion
674: first reinforcement portion, reinforcement portion
675: second reinforcement portion
676: front wall portion
780: guide member
G: gap

The invention claimed is:

1. A conveyance seat, comprising:
a seat back serving as a backrest portion; and
a side airbag device attached to a side part of the seat back in a seat width direction in order to mitigate an impact applied from a side of a conveyance, wherein
the seat back includes
a back frame having side frames disposed on right and left sides in the seat width direction, and
a side support member attached to a seat front part of the side frame and protruding to a seat front side beyond the side frame in order to cause a side portion of the seat back to protrude to the seat front side,
the side support member elongatedly extends in an up to down direction along the side frame and is disposed to form a gap with the side frame in a seat front to back direction,
the side airbag device includes an airbag module attached to one side surface that is either an outside surface or an inside surface of the side frame,
the airbag module has
a first airbag inflation-deployed on the one side surface side of the side frame,
a second airbag inflation-deployed on the other side surface side of the side frame, and
an inflator supplying gas into the first airbag and the second airbag, and
the second airbag passes through the gap formed between the side frame and the side support member in the seat front to back direction and is inflation-deployed on the other side surface side of the side frame.

2. The conveyance seat according to claim 1, wherein
the side support member is a linear member attached to each of an upper part of the side frame and a lower part of the side frame and elongatedly extending in the up to down direction,
the airbag module is attached to the outside surface of the side frame,
the first airbag is inflation-deployed toward the seat front on the outside surface side of the side frame, and
the second airbag passes through the gap formed between the side frame and the linear member and is inflation-deployed toward an inside in the seat width direction on the inside surface side of the side frame.

3. The conveyance seat according to claim 1, wherein
the seat back includes a protective member attached to the side surface of the side frame and covering the side frame, and
the protective member is disposed so as to cover at least a front end portion of the side frame and a rear end portion of the side frame.

4. The conveyance seat according to claim 3, wherein
the side frame has
a frame main body portion extending in the seat front to back direction,
a front flange portion protruding to an inside in the seat width direction continuously from a front end portion of the frame main body portion, and
a rear flange portion protruding to the inside in the seat width direction continuously from a rear end portion of the frame main body portion,
the protective member is a flexible protective plate, and
the protective plate has
a plate main body portion covering an inside surface of the frame main body portion,
a plate front portion folded back in order to cover the front flange portion continuously from a front end portion of the plate main body portion, and
a plate rear portion folded back in order to cover the rear flange portion continuously from a rear end portion of the plate main body portion.

5. The conveyance seat according to claim 3, wherein
the back frame has an upper frame connecting upper end portions of the right and left side frames, and
the seat back includes a second protective member covering a part of the upper frame connected to the upper end portion of the side frame.

6. The conveyance seat according to claim 1, wherein
the seat back includes
a pad material disposed on a front surface of the back frame,
a skin material covering the back frame and the pad material, and
a movable body provided at the side portion of the seat back, disposed between the side frame and the pad material in the seat front to back direction, and movable in order to cause the pad material to protrude to the seat front side at the side portion, and
the movable body moves to the seat front side as the second airbag is inflation-deployed and causes the pad material to protrude to the seat front side.

7. The conveyance seat according to claim 6, wherein the movable body has a rotating member attached to the side support member so as to be rotatable, rotating to the seat front side as the second airbag is inflation-deployed, and causing the pad material to protrude to the seat front side.

8. The conveyance seat according to claim 7, wherein the rotating member has
a rotating main body portion attached to the side support member so as to be rotatable and extending to a seat rear from the side support member along a bottom surface of the pad material, and
a protruding portion protruding from a front surface of the rotating main body portion toward the pad material and abutting against the pad material.

9. The conveyance seat according to claim 6, wherein
the side airbag device further includes a guide member guiding the inflation deployment of the second airbag,
one end portion of the guide member is attached to the side frame or an attachment bracket attached to the side frame, and
the other end portion of the guide member is attached to the movable body.

10. The conveyance seat according to claim 1, wherein
the side airbag device further includes a guide member guiding the inflation deployment of the second airbag,
one end portion of the guide member is attached to an attachment bracket attached to the side surface of the side frame, and the other end portion of the guide member is attached to the second airbag, and
the attachment bracket is fastened together with the side frame by an assembly shaft provided on the inflator and protruding from the inflator toward the seat width direction.

11. The conveyance seat according to claim 10, wherein the attachment bracket has a slit disposed inside the side frame in the seat width direction for the one end portion of the guide member to be inserted therethrough and attached.

12. The conveyance seat according to claim 1, wherein
the seat back includes a pad material disposed on a front surface of the back frame and a skin material covering the back frame and the pad material, the side airbag device has a retainer member holding the airbag module from a seat rear side, the retainer member has a rear wall portion disposed on the seat rear side of the airbag module, and a side wall portion extending to the seat front side along a side surface of the airbag module continuously from one end portion of the rear wall portion in the seat width direction, and the side wall portion extends to the seat front side up to a skin burst-open portion or a position reaching a vicinity of the skin burst-open portion provided at the skin material and burst-opening when the first airbag is inflation-deployed.

13. The conveyance seat according to claim 1, wherein the side airbag device has a retainer member holding the airbag module from a seat rear side, the retainer member has a rear wall portion disposed on the seat rear side of the airbag module, a side wall portion disposed along the other side surface of the side frame, and a reinforcement portion attached to a rear surface of the rear wall portion and protruding to the seat rear, and the side wall portion is fastened together with the side frame by an assembly shaft provided on the inflator and protruding from the inflator toward the seat width direction.

14. The conveyance seat according to claim 1, wherein the side airbag device has a retainer member holding the airbag module from a seat lateral side, the retainer member has a side wall portion disposed along the side surface of the side frame, a front wall portion protruding in the seat width direction continuously from a front end portion of the side wall portion and disposed on a seat rear side of the second airbag when the second airbag is inflation-deployed, and a reinforcement portion attached to a rear surface of the front wall portion and protruding to the seat rear, and the side wall portion is fastened together with the side frame by an assembly shaft provided on the inflator and protruding from the inflator toward the seat width direction.

15. The conveyance seat according to claim 1, wherein the seat back includes a pad material disposed on a front surface of the back frame and a skin material covering the back frame and the pad material, the pad material has a pad through hole formed at a position in front of the airbag module in the side portion of the seat back and penetrating the pad material from an outside surface to an inside surface, the skin material has a skin burst-open portion burst-opening during the inflation deployment of the first airbag on an outside surface of the side portion, the side airbag device includes a guide member guiding the inflation deployment of the first airbag, and the guide member has a configuration in which one end portion of the guide member is attached to a front part or an outside part of the skin material at the side portion, the guide member extends continuously from the one end portion of the guide member and passes through the pad through hole formed in the outside surface of the pad material at the side portion, and the other end portion of the guide member passes through the pad through hole formed in the inside surface of the pad material at the side portion and is attached to an inside part of the skin material at the side portion.

\* \* \* \* \*